(12) United States Patent
Kurachi

(10) Patent No.: US 8,357,761 B2
(45) Date of Patent: Jan. 22, 2013

(54) POLYMER COMPOSITION, TRANSFERRING BELT FOR ELECTROPHOTOGRAPHY, IMAGE-FORMING APPARATUS AND METHOD FOR PRODUCING POLYMER COMPOSITION

(75) Inventor: Yasuo Kurachi, Tokyo (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 248 days.

(21) Appl. No.: 12/635,308

(22) Filed: Dec. 10, 2009

(65) Prior Publication Data

US 2010/0144972 A1 Jun. 10, 2010

(30) Foreign Application Priority Data

Dec. 10, 2008 (JP) ................................. 2008-314460
Dec. 16, 2008 (JP) ................................. 2008-319915

(51) Int. Cl.
*C08L 77/00* (2006.01)
*C08L 81/04* (2006.01)
*B29C 47/88* (2006.01)

(52) U.S. Cl. .................. 525/420; 264/211.2; 366/76.93; 366/336; 366/337; 366/338; 399/313; 525/535; 525/537

(58) Field of Classification Search .................. 525/420, 525/535, 537; 264/211.12; 366/76.93, 336; 366/337, 338; 399/313
See application file for complete search history.

(56) References Cited

U.S. PATENT DOCUMENTS

| 4,334,783 | A | | 6/1982 | Suzaka |
| 4,783,319 | A | | 11/1988 | Habrich et al. |
| 5,254,609 | A | * | 10/1993 | Serizawa et al. ............. 524/114 |
| 5,335,992 | A | | 8/1994 | Holl |
| 5,376,996 | A | | 12/1994 | Sankaran |
| 2009/0074478 | A1 | | 3/2009 | Kurachi |

FOREIGN PATENT DOCUMENTS

| EP | 0 191 453 A2 | 8/1986 |
|---|---|---|
| JP | 52-12240 B | 4/1977 |
| JP | 53-69255 | 6/1978 |
| JP | 55-084528 | 6/1980 |
| JP | 56-166926 | 12/1981 |
| JP | 57-135034 | 8/1982 |
| JP | 61-7332 A | 1/1986 |
| JP | 62-197422 A | 9/1987 |
| JP | 6-49356 A | 2/1994 |
| JP | 08-224711 | 9/1996 |
| JP | 9-291213 A | 11/1997 |
| JP | 10-085574 | 4/1998 |
| JP | 11-048307 | 2/1999 |
| JP | 2001-117385 | 4/2001 |
| JP | 2005-139347 | 6/2005 |
| JP | 2007-197695 | 8/2007 |
| JP | 2007-223274 | 9/2007 |
| JP | 2008-110282 | 5/2008 |
| JP | 2009-001609 | 1/2009 |
| SU | 1781050 A1 | 12/1992 |
| WO | WO 99/33918 | 7/1999 |
| WO | WO 2005/000964 | 1/2005 |

OTHER PUBLICATIONS

Office Action (Preliminary Notice of Rejection) dated Nov. 9, 2010, issued in the corresponding Japanese Patent Application No. 2008-314460, and an English Translation thereof.
The First Office Action dated Jun. 24, 2011, issued in the corresponding Chinese Patent Application No. 200910253442.6, and an English Translation thereof.
Jung-Bum An et al., Studies on Miscibility and Phase-Separated Morphology of Nylon 4,6/Poly(Phenylene Sulfide) Blend Under Shear Flow, 2002, pp. 407-418, J. Macromol. Sci-Phys., B41(3).
Database WPI Week 200514, Thomson Scientific, London, GB; An 2005-132028, Feb. 11, 2010, 3 pages, XP002567738.
European Search Report issued in the corresponding Application No. 09178317.5-2102 dated Feb. 17, 2010.
Office Action dated Oct. 28, 2011, issued in the corresponding European Patent Application No. 09 178 317.5.
Office Action (Preliminary Notice of Rejection) dated Apr. 26, 2011, issued in the corresponding Japanese Patent Application No. 2008-319915, and an English Translation thereof.
Office Action (The Second Office Action) dated Feb. 13, 2012, issued in the corresponding Chinese Patent Application No. 200910253442.6, and an English Translation thereof. (17 pages).
Office Action dated Mar. 12, 2012, issued in the corresponding European Patent Application No. 09 178 317.5-2102. (5 pages).
Office Action issued in corresponding Chinese Patent Application No. 200910253442.6, issued May 17, 2012, and English Translation thereof.
Office Action issued in corresponding Chinese Patent Application No. 200910253342.6, issued Sep. 24, 2012, and English Translation thereof.

* cited by examiner

*Primary Examiner* — Ana Woodward

(74) *Attorney, Agent, or Firm* — Buchanan Ingersoll & Rooney PC

(57) ABSTRACT

A polymer composition containing two kinds of polymers and having a difference in its glass transition temperature of 3° C. or lower between before and after heat-treatment by getting it through a space between two parallel faces in a molten state.

3 Claims, 10 Drawing Sheets

10B

10A

10C

10 μm

Structure of 6 μm

10 μm

POLYMER COMPOSITION, TRANSFERRING BELT FOR ELECTROPHOTOGRAPHY, IMAGE-FORMING APPARATUS AND METHOD FOR PRODUCING POLYMER COMPOSITION

This application is based on applications No. 2008-314460 and 2008-319915 filed in Japan, the contents of which are hereby incorporated by reference.

BACKGROUND OF THE INVENTION

1. Field of the Invention

The present invention relates to a method for producing a polymer composition that is used in wide varieties of applications such as general consumer products, industrial products and foods and also to a production apparatus by the method.

The present invention relates to a polymer composition containing a polyphenylene sulfide resin superior in toughness such as impact strength and tensile elongation and a molded article produced by using the polymer composition, which can be used widely in various fields such as electric and electronic parts, auto-parts, and general mechanical parts.

The present invention relates to an electrophotographic transferring belt and an image-forming apparatus having equipped with the transferring belt.

2. Description of the Related Art

Polyphenylene sulfide resins (hereinafter, referred to as "PPS resins"), which have properties favorable as engineering plastics such as high heat resistance, high flame resistance, high rigidity, high chemical resistance and high electric insulating property, have been used mainly for injection molding in various applications such as electric and electronic parts, mechanical parts and auto-parts. However, PPS resins are not sufficiently high in toughness, compared to other engineering plastics such as polyamide resins. For that reason, PPS resins have been used mostly in combination with a reinforcing agent such as glass fiber for improvement in strength.

However, in recent trend for reduction in weight and improvement in surface smoothness, there is increasing demanded for non-reinforced materials also of PPS resins without any added reinforcement materials such as glass fiber and consequently, need for non-reinforced PPS material superior in toughness.

For improvement in toughness of non-reinforced PPS materials, known is a PPS resin composition containing a polyamide resin. For example, as disclosed in Japanese Patent application Laid-Open No. sho53-69255, Japanese Patent application Laid-Open No. Hei6-49356, many studies aimed at improving toughness of PPS resin by blending it with a high-toughness material are now in progress. If PPS and polyamide are compatible with each other uniformly, as sugar is dissolved in water, it is possible to achieve the object by the method disclosed. However, it is known that PPS and polyamide are hardly compatible with each other and only 4,6 nylon is compatible with PPS at a temperature of 300° C. or higher, but phase separation occurs when the blend is cooled (J. MACROMOL. SCI. PHYS., B41 (3), 407-418 (2002), Jung-Bum An, Takeshi Suzuki, Toshiaki Ougizawa, Takeshi Inoue, Kenji Mitamura and Kazuo Kawanishi). As it is well recognized, a blend of polymer and elastomer shows remarkably improved physical properties, when they are compatibilized, but, such a favorable combination with the PPS resin is not known. Thus, blend with other elastomer is not an effective means of improving strength and other physical properties and may instead impair favorable properties of the PPS resin such as high modulus and high combustion resistance.

On the other hand, Japanese Patent application Laid-Open No. Hei9-291213 and Japanese Patent application Laid-Open No. sho62-197422 disclose oxidatively crosslinked PPS resins resistant to weld cracking and superior in mechanical strength, but they are still not satisfactory in toughness such as tensile elongation and impact strength. In addition, the oxidative crosslinking treatment has a problem that it is difficult to apply it to applications demanding continuous production of molded articles, for example by extrusion molding.

In addition, if a PPS resin composition is used in production of a transferring belt in the electrophotographic application, it is necessary to make the resin's conductivity uniform in the semiconductor range by adding a conductive substance such as carbon, but PPS resins often prohibit favorable dispersion of carbon, unfavorably leading to change in the dispersion state of carbon during extrusion molding and uneven distribution of conductivity. A transferring belt having uneven distribution of conductivity has a problem of filming during long-term printing.

Further, because various components are solubilized and dispersed not sufficiently uniformly in conventional PPS resin compositions, molded articles prepared by using such a composition showed great change in glass transition temperature before and after molding treatment. Thus, the wastes from molded article or those generated in the production process could not be used as raw materials for recycling.

By the way, known as the methods for producing a polymer composition by blending two or more compounds containing at least one kind of polymer are batch-wise production methods of using a batch-wise apparatus such as Banbury mixer, kneader or roll and continuous production methods of using a continuous apparatus such as uniaxial kneading machine, biaxial kneading machine, or mill kneading machine. Polymer compositions such as a blend of polymer and compounding ingredient or plural polymers, and polymer alloys are produced in these apparatuses, as they are blended under elongation flow and shearing flow.

However even if a polymer composition is produced in a known kneading machine or by a kneading method, it was difficult to mix the components constituting the polymer composition uniformly, in particular to disperse the additives contained in the polymer composition uniformly. It was thus not possible to control physical properties of a molded article produced by using the polymer composition obtained to a level satisfying requirements needed in its application.

For example in production of a semiconductive polymer by dispersing a conductive substance in an insulative polymer, it was difficult to reduce unevenness in resistance of the resulting semiconductive polymer to a satisfactory level. In production of a polymer alloy by blending two kinds of polymers less compatible with each other for example, it was difficult to control diameters of polymer particles dispersed in the polymer alloy to less than 1 μm.

BRIEF SUMMARY OF THE INVENTION

An object of the present invention is to provide a polyphenylene sulfide-containing polymer composition superior in toughness.

Another object of the present invention is a polyphenylene sulfide-containing polymer composition superior in toughness and also in uniform dispersion of additives, especially additives containing a conductive material such as carbon, and an electrophotographic transferring belt.

Another object of the present invention is to provide an image-forming apparatus resistant to filming.

An object of the present invention is to provide a method and an apparatus for producing a polymer composition superior in uniform dispersion.

A polymer composition in the present invention comprises two or more kinds of polymers containing a polyphenylene sulfide resin in an amount of 70 wt % or more, and shows change (or difference) in its glass transition temperature of 3° C. or lower between before and after heat-treated by getting it through a space between two parallel faces in a molten state.

An electrophotographic transferring belt in the present invention used for electrophotographic image-forming apparatus comprises two or more kinds of polymers containing a polyphenylene sulfide resin in an amount of 70 wt % or more, and shows change in its glass transition temperature of 3° C. or lower between before and after heat-treated by getting it through a space between two parallel faces in a molten state.

An image-forming apparatus in the present invention comprises an image forming unit for forming a developer image, a transferring belt on which the developer image is transferred, and a transfer device for transferring the developer image on the transferring belt onto a recording medium. Here, the transferring belt comprises two or more kinds of polymers containing a polyphenylene sulfide resin in an amount of 70 wt % or more, and shows change in its glass transition temperature of 3° C. or lower between before and after heat-treated by getting it through a space between two parallel faces in a molten state.

A method for producing a polymer composition in the present invention comprising: melting a polymer mixture containing at least one kind of polymer and getting the molten polymer mixture through a space between two parallel faces twice or more.

Because the polymer composition according to the present invention contains various components solubilized and dispersed sufficiently uniformly, if it is heat-treated, there is almost no change in the glass transition temperature between before and after the heat treatment. Thus, the wastes from molded articles produced by using the polymer composition or those generated in the production process can be used effectively as raw materials recycled.

According to the production method and the production machine in the present invention, it becomes possible to produce a polymer composition with various components dispersed sufficiently uniformly. Thus, it is possible to easily produce a product or semi-finished product superior in various physical properties, e.g., in electrical characteristics and mechanical properties such as toughness, rigidity and elasticity.

DETAILED DESCRIPTION OF THE INVENTION

Polymer Composition

The polymer composition according to the present invention is a polymer composition containing at least a polyphenylene sulfide resin (hereinafter, referred to as PPS resin) and showing almost no change in a glass transition temperature between before and after heat treatment even if it is subjected to the heat treatment. Specifically, when the glass transition temperature of the polymer composition before heat treatment is designated as $Tg_1$ and that of the polymer composition after heat treatment as $Tg_2$, the difference between them, $Tg_1$-$Tg_2$, is 3° C. or lower, particularly 0 to 3° C., and preferably 0 to 2° C. Polymer compositions having a Tg difference of more than 3° C. are insufficient in solubility/dispersibility of various kinds of components and thus, the wastes of molded articles produced by using the polymer composition and those generated in the production process cannot be recycled. Even if additives are added, the additives are not dispersed uniformly in the polymer compositions and the molded articles formed of the compositions. Thus if the molded article is in particular a transferring belt used in an image-forming apparatus in the electrophotographic process and the additive is a conductive substance such as carbon, it is not possible to obtain a transferring belt sufficiently uniform in conductivity.

The heat treatment above is a process of getting a polymer composition in a molten state through a space between two parallel faces, and, in the present invention, the process of getting the polymer composition through a space between two parallel faces is repeated twice or more. In the present invention, such heat treatment causes almost no change in glass transition temperature between before and after the treatment because solubilization/dispersion of various kinds of components are sufficiently uniform in the polymer composition according to the present invention. Heat treatment of a polymer composition in which the various components are not solubilized/dispersed sufficiently uniformly leads to sufficiently uniform solubilization/dispersion, and thus to relatively large change in glass transition temperature between before and after the heat treatment, normally reduction of glass transition temperature by the heat treatment.

Figure 1:
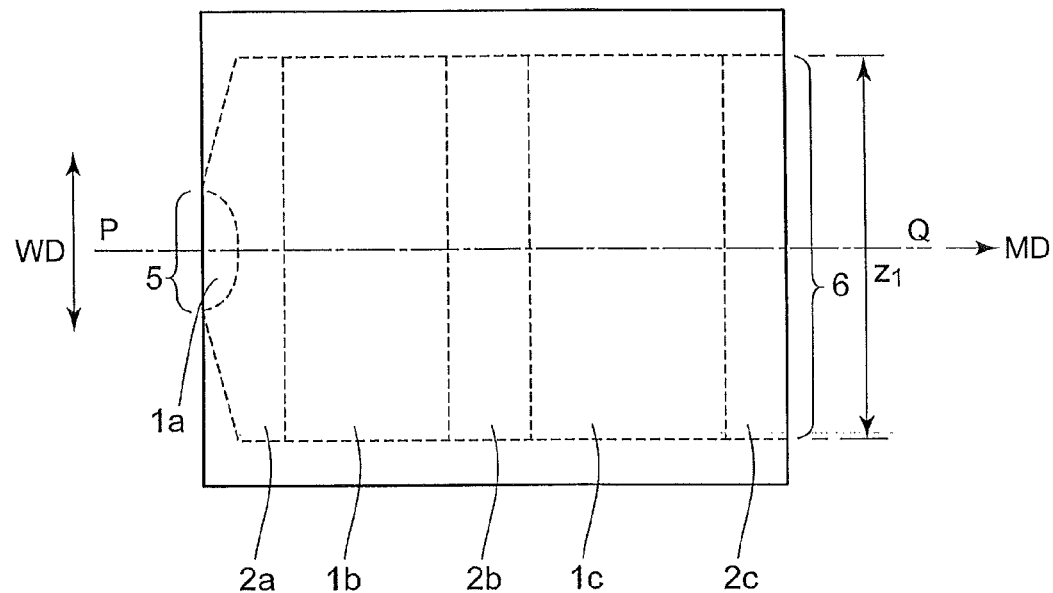
FIG. 1(A) is a schematic perspective view illustrating an apparatus for heat treatment, seen from the top face through which the interior of the apparatus is seen.
FIG. 1(B) a schematic sectional view of the apparatus of FIG. 1(A) along the line P-Q.
Figure 1:
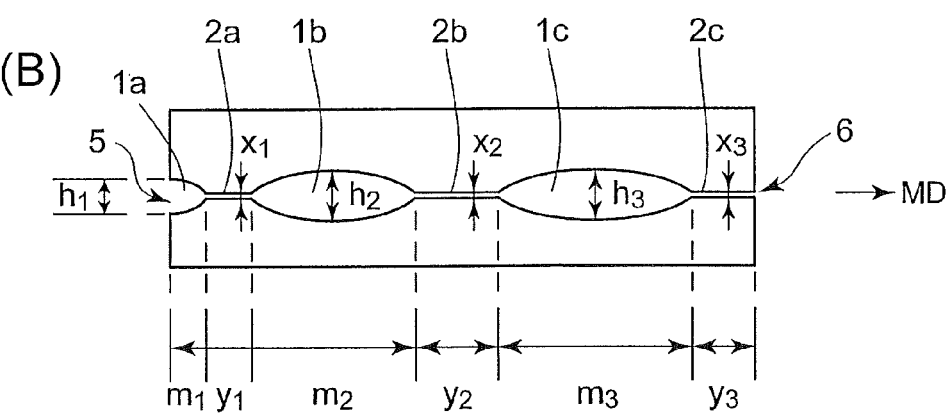

The heat treatment is performed by melting and kneading a polymer composition in an extrusion kneader, and feeding the polymer composition in the molten state extruded after kneading, for example, into a space made of two parallel planes in a space-flow treatment apparatus shown in FIG. 1(A) or 1B. FIG. 1(A) is a schematic perspective view of an apparatus performing a space-flow treatment three times, seen from the top face through which the interior of the apparatus is seen, and FIG. 1(B) is a schematic sectional view of the apparatus of FIG. 1(A) along the line P-Q. The apparatus of FIG. 1 (A) or FIG. 1(B) has an almost rectangular shape as a whole. In the apparatus of FIG. 1 (A) or FIG. 1(B), an inflow opening 5 is connected to a discharge opening of an extrusion kneader (not shown in the Figure) so that the extrusion force of the extrusion kneader is used as a force propelling the movement of the polymer mixture in the molten state as a whole through spaces 2a, 2b and 2c in the moving direction MD. The apparatus of FIG. 1 (A) or FIG. 1(B), which is used in this way as connected to the discharge opening of the extrusion kneader, may be called a die.

The apparatus of FIG. 1(A) or 1(B) is only an example showing the advantageous effects of the present invention, and a mold of extrusion molding apparatus or a mold of injection molding can also show similar advantageous effects if it has a space made of two parallel planes. The apparatus of FIG. 1 (A) or (B) has, specifically, an inflow opening 5 for supply of the polymer mixture to be treated and a discharge opening 6 for discharge of the treated polymer mixture, and the three spaces (2a, 2b, and 2c) between two parallel planes for processing of polymer mixture that are placed between the inflow opening 5 and the discharge opening 6. It normally has reservoirs 1a, 1b and 1c immediately upstream of the spaces 2a, 2b and 2c, respectively, the reservoir having a sectional area larger than that of the space. The polymer mixture extruded out of an extrusion kneader during treatment is fed in a molten state by extrusion force of the extrusion kneader through the inflow opening 5 into the reservoir 1a of the apparatus 10A of FIG. 1 (A), (B) and spread in the width direction WD. Then, the polymer mixture passes through the space 2a continuously in the moving direction MD and in the width direction WD into the reservoir 1b, further through the space 2b into the reservoir 1c and finally through the space 2c, and is discharged from the discharge opening 6. In the present description, the sectional area is intended to mean the cross section vertical to the moving direction MD. In particular, the sectional area of the reservoir means the maximum sectional area of the reservoir in the cross section vertical to the moving direction MD.

In FIG. 1 (A), (B), the distances $x_1$, $x_2$ and $x_3$ between the two parallel planes of the spaces 2a, 2b and 2c may be independently 0.01 mm or more and less than 10 mm, and, for example, $x_1$, $x_2$ and $x_3$ may be respectively 2 mm.

In FIG. 1 (A), (B), the distance $y_1$ of the space 2a in the moving direction MD, the distance $y_2$ of the space 2b in the moving direction MD and the distance $y_3$ of the space 2c in the moving direction MD each independently may be 1 to 300 mm and, for example, $y_1$, $y_2$ and $y_3$ may be respectively 30 mm.

In FIG. 1 (A), (B), the distance $z_1$ of each of the spaces 2a, 2b and 2c in the width direction WD is not particularly limited, and may be independently 100 to 1000 mm, and, for example, $z_1$ is 300 mm.

In FIG. 1 (A), (B), the maximum heights $h_1$, $h_2$ and $h_3$ of the reservoirs 1a, 1b and 1c are respectively longer than the face-to-face distances $x_1$, $x_2$ and $x_3$ of the spaces 2a, 2b and 2c immediately downstream, and normally, each independently may be 3 to 100 mm, and, for example, $h_1$, $h_2$, $h_3$ may be respectively 10 mm. In the present description, the maximum height of the reservoir means the maximum height in the cross section vertical to the width direction WD, in the case of an apparatus in the rectangular shape.

In FIG. 1(A) or 1(B), the ratio $S_{1a}/S_{2a}$ of the cross-sectional area $S_{2a}$ of the space 2a and the maximum cross-sectional area $S_{1a}$ of the adjacent reservoir 1a, the ratio $S_{1b}/S_{2b}$ of the cross-sectional area $S_{2b}$ of the space 2b and the maximum cross-sectional area $S_{1b}$ of the adjacent reservoir 1b, and the ratio $S_{1c}/S_{2c}$ of the cross-sectional area $S_{2c}$ of the space 2c and the maximum cross-sectional area $S_{1c}$ of the adjacent reservoir 1c, may be independently 2 to 100, and, for example, these ratios may be respectively 5.

In FIG. 1 (A) or 1(B), the distance $m_1$ of the reservoir 1a in the moving direction MD, the distance $m_2$ of the reservoir 1b in the moving direction MD, and the distance $m_3$ of the reservoir 1c in the moving direction MD are not particularly limited, normally independently may be 1 to 300 mm, and, for example, $m_2$ and $m_3$, which correspond to the reservoirs 1b and 1c between the spaces 2a, 2b, 2c, may be both 20 mm. The distance $m_1$ may normally be 2 mm.

The flow rate of the polymer composition in a molten state through the space may be 1 to 5000 g/minute per 1 cm² of sectional area of the space, and, for example, the flow rate may be 83.3 g/minute.

The flow rate can be calculated by dividing the discharge rate (g/minute) of the polymer composition extruded out of the discharge opening by the sectional area of the space (cm²).

The viscosity of the polymer composition during space-pacing is not particularly limited, if the above flow rate is obtained during the space-passing, and may normally be 1 to 10000 Pa·s, and, for example, the viscosity may be 10 to 8000 Pa·s.

The viscosity of the polymer composition is determined by using a viscoelasticity meter MARS (manufactured by HAAKE corporation).

The pressure for moving the polymer composition in the molten state in the moving direction MD and the temperature of the polymer composition during heat treatment are not particularly limited, if the above flow rate is obtained during space-passing.

As an extrusion kneader having a discharge opening connected to the inflow opening 5 of the apparatus of FIG. 1 (A), (B), a known extrusion kneader used in molding processing may be used, and for example, uniaxial or biaxial extrusion kneaders, such as PG-PEX (manufactured by PLL Giken Co., Ltd), GT-UT (manufactured by Research Laboratory of Plastic Technology Co., Ltd), DHT (manufactured by Hitachi Zosen Corporation), GS-MS-TS (manufactured by Ikegai Ltd), and biaxial extrusion kneader KTX46 (manufactured by Kobe Steel, Ltd) can be used.

Melting and kneading conditions in the extrusion kneader is not particularly limited, insofar as the desired flow rate of the polymer composition is obtained during space-passing, and, for example, the screw rotation number may be 100 to 1000 rpm. If there is concern about decomposition of the polymer by heat generation during kneading, the screw rotation number may be preferably lowered to 200 to 500 rpm.

After heat treatment, the heat-treated polymer composition is normally cooled rapidly, and the glass transition temperature of the rapidly cooled polymer composition is determined.

The rapid cooling is carried out by immersing the polymer composition in the molten state into water at 0 to 60° C. Alternatively, it may be cooled rapidly with gas at −40° C. to 60° C. or in contact with metal at −40° C. to 60° C.

The polymer composition according to the present invention has a single glass transition temperature before and after the heat treatment, the difference of which is in the range above.

Figure 2:
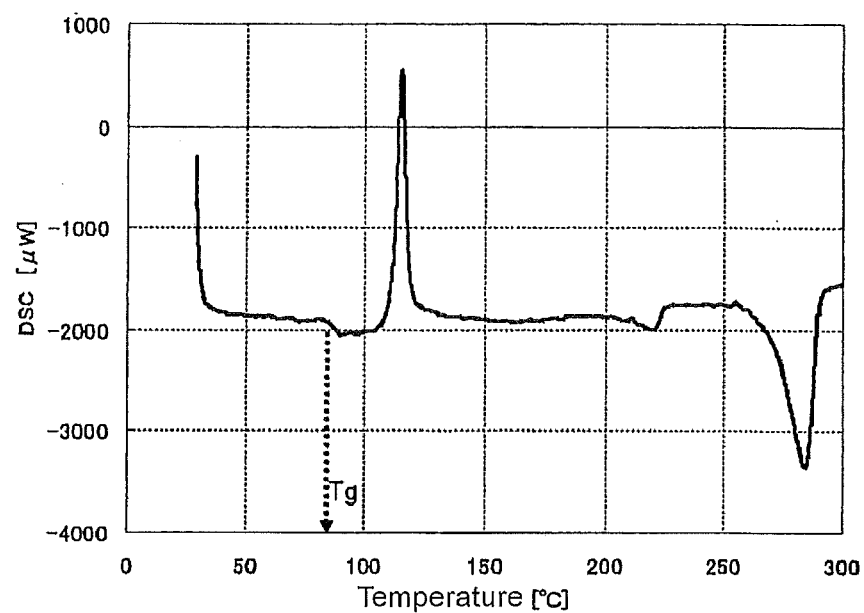
FIG. 2 is a graph showing an example of calorimetric change when a PPS resin-containing polymer composition according to the present invention is analyzed by DSC.

The term "having a single glass transition temperature" means that the polymer composition has only one glass transition temperature, and specifically, the polymer composition shows only one glass transition in a range of 50° C. to 200° C., when analyzed by differential scanning calorimetry (hereinafter, referred to as DSC). FIG. 2 is an example of a graph showing the calorimetric change, when a PPS resin-containing polymer composition according to the present invention is analyzed by DSC, wherein the abscissa indicates the temperature change and the ordinate indicates the calorimetric change, and the upper side above the standard line indicates heat generation, the down side below the standard line indicates heat absorption. For example, in the graph shown in FIG. 2, the portion where the standard line shifts approximately parallel to the endothermic side at around 82° C. indicates glass transition. In the present invention, the shift of standard line indicating the glass transition occurs only once in the range of 50° C. to 200° C. In FIG. 2, a sharp peak observed in the range of 100° C. to 150° C. shows crystallization of PPS. The glass transition temperature in the present specification uses a measurement value measured by differential scanning calorimeter (produced by Seiko Instruments Inc.), but the measuring machine is not particularly limited. As for measuring conditions, a rate of temperature rise is important and it is necessary to make measurement at a rate of temperature rise of 5° C./rain. It is because an excessively high or low rate of temperature rise may often lead to deformation of the Tg shape and thus prohibit measurement. When there is only one Tg observed under the measuring conditions above, the polymer composition has a single glass transition temperature.

The single glass transition temperature of the polymer composition according to the present invention, especially before heat treatment, is preferably 25° C. or higher and 150° C. or lower, more preferably 88° C. or lower, particularly preferably 80 to 88° C., and still more preferably 83 to 87° C., and it shows change in the above range after heat treatment.

Figure 3:
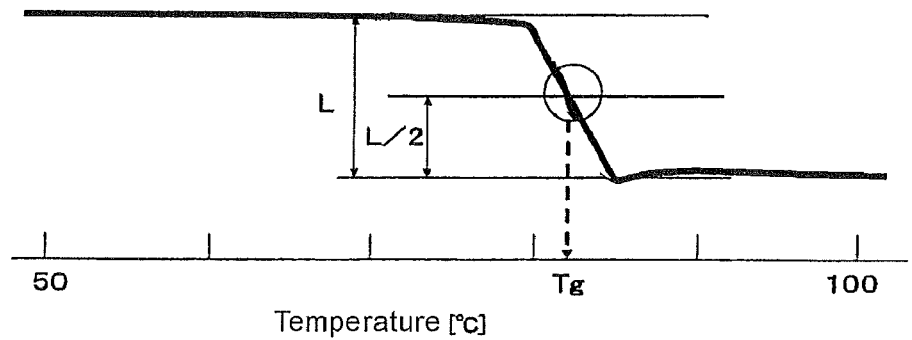
FIG. 3 is a partially magnified graph of FIG. 2 explaining the method of determining a glass transition temperature.

FIG. 3 is a partial magnified view of FIG. 2. Parallel lines extending from the high temperature-sided standard line and the low temperature-sided standard line are drawn. A line at a height of half of the distance (L) between these parallel lines, ½-height (L/2) line, is drawn additionally. It is possible to determining a glass transition temperature (Tg) from the intersection of the L/2 straight line and the endothermic curve.

Figure 4:
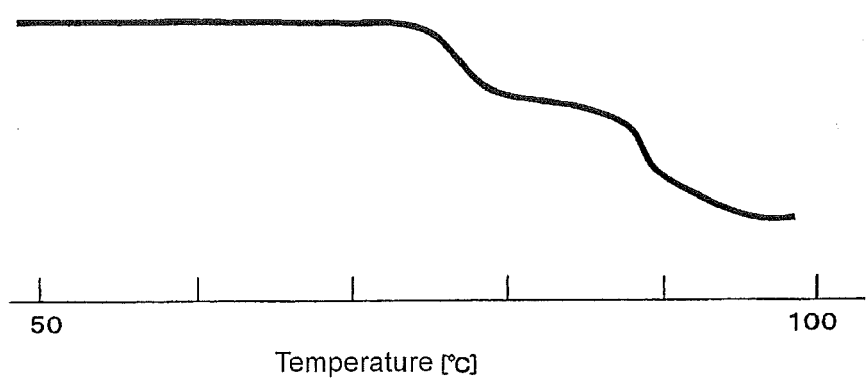
FIG. 4 is a graph showing an example of the calorimetric change when a PPS resin-containing polymer composition prepared according to conventional technology is analyzed by DSC.

FIG. 4 shows a case where there are two Tg's observed (e.g., those of PPS and nylon resins), and the polymer composition used in measurement, which shows two glass transitions showing approximately parallel shift of the standard line toward the endothermic direction, is not included in the scope of the present invention. In such a polymer composition, the PPS resin and the nylon resin are solubilized not effectively with each other, leading to relatively large change of Tg by the heat treatment and prohibiting sufficiently high toughness. Addition of an additive such as carbon to such a polymer composition results in uneven dispersion of the additive or fluctuation in the dispersion state in a molding processing step.

Figure 5:
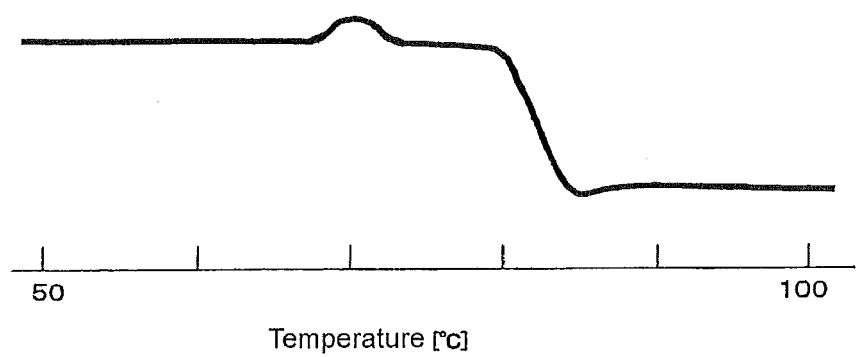
FIG. 5 is a graph showing an example of the calorimetric change when a PPS resin-containing polymer composition according to the present invention is analyzed by DSC.

In the present invention, as shown in FIG. 5, a crystallization peak of a resin, such as a nylon resin, contained with the PPS resin may be observed in a temperature region lower than Tg. In this case too, there is observed only one glass transition that shows a parallel shift of the standard line toward the endothermic side, indicating that the polymer composition measured has only one glass transition temperature.

(Method and Apparatus for Producing Polymer Composition)

The polymer composition according to the present invention can be produced by subjecting a polymer mixture to space-through treatment in a molten state.

The polymer mixture is a mixture of two or more polymers at least containing a PPS resin. Polymers other than the PPS resin contained in the polymer mixture are not particularly limited, and any known polymers may be used. The other polymer for use is preferably a polymer less compatible with the PPS resin, and examples thereof include nylon resins, epoxy resins, polyester resins, polycarbonate resins, acrylonitrile-butadiene-styrene resins, polyether sulfone, polyether ether ketone, polyamide-imide, polyethylene terephthalate and the like. Two or more of them may be used in combination with the PPS resin.

The PPS resin for use in the present invention is polyphenylene sulfide useful as a so-called engineering plastic. The molecular weight of the PPS resin is not particularly limited, but, for improvement in melt fluidity, use of a PPS resin having a peak molecular weight, as determined in the molecular weight distribution by gel penetration chromatography, of 5000 to 1000000, particularly 45000 to 90000, is preferable.

The method for producing the PPS resin is not particularly limited, and, for example, known methods such as those described in JP-B No. Sho52-12240 and JP-A No. Sho61-7332 can be used in production.

Such PPS resins are also commercially available from Toray Industries, Inc., DIC Corporation etc.

The PPS resin may be used after various treatments in the range that does not impair the advantageous effects of the present invention. Examples of such treatments include heat treatment under inert gas atmosphere such as nitrogen or under reduced pressure (vacuum), cleaning treatment, for example, with hot water, and activation by a functional group-containing compound such as acid anhydride, amine, isocyanate, or functional group-containing disulfide compound.

The nylon resin is a resin also called polyamide in the present invention. The nylon resin is not particularly limited, and any polyamide may be used. Typical examples thereof include polyamides obtained by ring-opening polymerization of a lactam such as ∈-caprolactam or ω-dodecalactam; polyamides obtained from an amino acid such as 6-aminocaproic acid, 11-aminoundecanoic acid, or 12-aminododecanoic acid; polyamides and copolyamides obtained from an aliphatic, alicyclic or aromatic diamine such as ethylenediamine, tetramethylenediamine, hexamethylenediamine, undecamethylenediamine, dodecamethylenediamine, 2,2,4-/2,4,4-trimethylhexamethylenediamine, 1,3- and 1,4-bis(aminomethyl)cyclohexane, bis(4,4'-aminocyclohexyl)methane, or meta-/para-xylylenediamine and an aliphatic, alicyclic or aromatic dicarboxylic acid such as adipic acid, suberic acid, sebacic acid, dodecanedicarboxylic acid, 1,3- and 1,4-cyclohexanedicarboxylic acid, isophthalic acid, terephthalic acid, or dimer acid, or the acid derivative such as acid halide (e.g., acid chloride); the mixed polyamides thereof and the like. Normally in the present invention, polytetramethylene adipamide (nylon 46), polyamide from meta-xylylenediamine and adipic acid, polycapramide (nylon 6), polyundecaneamide (nylon 11), polydodecaneamide (nylon 12), polyhexamethylene adipamide (nylon 66) and copolyamides containing these polyamide raw materials as the principal components are useful among them.

The polymerization degree of the nylon resin is not particularly limited, and, for example, a polyamide having a relative viscosity (as determined by dissolving 1 g of the polymer in 100 ml of 98% conc. sulfuric acid and measuring the solution at 25° C.) in the range of 2.0 to 5.0 may be used arbitrarily according to the aim of the present application.

The polymerization method of the nylon resin is not particularly limited, and may be a normally known melt-polymerization method, a solution polymerization method or a method in combination thereof.

The nylon resins are also commercially available as MXD6 (manufactured by Mitsubishi Gas Chemical Company, Ltd), 4,6 nylon (manufactured by DSM Japan Engineering Plastics), Zytel (Du Pont Company) and others.

The epoxy resin is a low- to high-molecular-weight compound having two or more epoxy groups in a molecule or a low- to high-molecular-weight compound having the epoxy groups inactivated with other reactive organic compounds, and examples thereof include bisphenol A-type epoxy resins, bisphenol F-type epoxy resins, bisphenol S-type epoxy resins, phenolic novolak-type epoxy resins, cresol novolac-type epoxy resins, bisphenol A novolac-type epoxy resins, salicyl aldehyde novolac-type epoxy resins, bisphenol F novolac-type epoxy resins, alicyclic epoxy resins, glycidyl ester-type epoxy resins, glycidylamine-type epoxy resins, hydantoin-type epoxy resins and isocyanurate-type epoxy resins; the hydrogenated derivatives and halides thereof; a mixtures of two or more resins above, and the like. Examples of the alicyclic epoxy resins include bis(dicyclopentadiene)-type resins, dicyclopentadiene-type epoxy resins, cylcohexeneoxide-type epoxy resins and the like. Among them, bis(dicyclopentadiene)-type epoxy resins, bisphenol A-type epoxy resins, bisphenol F-type epoxy resins, bisphenol S-type epoxy resins and the like are preferable, because they are superior in the symmetry of the molecule skeleton and give hardened resin-products superior in dielectric properties.

The content of the PPS resin in the polymer mixture is 50 wt % or more, particularly 70 wt % or more, more preferably 70 to 98 wt %, and more preferably 85 to 97 wt %, with respect to the total amount of the composition. It is because increase in content of the PPS resin leads to reduction of compatibility/dispersibility of various components.

The polymer mixture may contain various additives according to the applications of the polymer composition obtained. The additives, if added, can be blended and dispersed sufficiently uniformly. Known additives in various applications can be used, and examples thereof include conductive substances, (conductivity-giving agent), reinforcing agents, antioxidants, heat stabilizers, lubricants, crystal nucleating agents, ultraviolet inhibitors, colorants, flame retardants and the like.

The conductive substance is not particularly limited, if it gives conductivity when added. For example, any conductive substance known in the field of electrophotographic transferring belt may be used. Typical examples of the conductive substances include carbons such as natural graphite, artificial graphite, coke, low temperature-baked carbon such as easily graphitizable carbon, and less graphitizable carbon obtained by carbonization of organic matters; metal oxide complex such as perovskite compounds, crystalline or amorphous oxides of zinc, tin, indium, antimony etc., and metal oxide fine particles of the oxides of these elements in combination; conductive or semiconductive polymers such as polyacetylene, polyaniline, polythiophene, and polymers having sulfonic or carboxylic acid groups on the side chains. Carbon is used favorably for imparting conductivity economically. Although carbon is generally less dispersible in resins, it can be dispersed sufficiently uniformly according to the present invention.

The content of the conductive substance is not particularly limited, but normally, 2 to 40 parts by weight with respect to 100 parts by weight of the total amount of the polymer components, and it is preferably 2 to 25 parts by weight, particularly to raise the surface resistance of the polymer composition to about $10^{10}\Omega/\square$. If two or more conductive substances are contained, the total amount is preferably in the range above.

A reinforcing agent is added for further improvement in strength, rigidity, heat resistance, dimensional stability and others. The reinforcing agents for use include fibrous and/or particulate reinforcing agents.

Examples of the fibrous reinforcing agents include inorganic fibers such as glass fiber, Shirasu glass fiber, alumina fiber, silicon carbide fiber, ceramic fiber, asbestos fiber, plaster fiber and metal fiber; carbon fiber and the like.

Examples of the particulate reinforcing agents include silicates such as wollastonite, sericite, kaolin, mica, clay, bentonite, asbestos, talc, and alumina silicate; metal oxides such as alumina, silicon oxide, magnesium oxide, zirconium oxide, and titanium oxide; carbonates such as calcium carbonate, magnesium carbonate and dolomite; sulfates such as calcium sulfate and barium sulfate; glass beads, boron nitride, silicon carbide, silica and the like, and these materials may be hollow inside.

The content of the reinforcing agent is not particularly limited, and normally 1 to 40 parts by weight, preferably 1 to 20 parts by weight from the viewpoint of toughness, particularly 1 to 10 parts by weight for improvement in dispersion with respect to 100 parts by weight of the total amount of the polymer components. If two or more reinforcing agents are contained, the total content thereof is preferably in the range above.

The total content of the additives is preferably 1 to 50 parts by weight, particularly 1 to 30 parts by weight, with respect to 100 parts by weight of the total amount of the polymer components for further improvement in dispersion.

When an additive is added to the PPS resin-containing polymer composition of the present invention, uniform dispersion of the additive can be achieved in the polymer composition and a molded article containing the polymer composition. As a result, when the molded article is a transferring belt used in an image-forming apparatus for electrophotography and the additive is a conductive substance such as carbon, uniform conductivity can be achieved in the transferring belt. The use of such a transferring belt can prohibit filming.

For example in production of a semiconductive polymer by dispersing a conductive substance in an insulative polymer, it is possible according to the present invention to produce a semiconductive polymer sufficiently lower in variability in resistance even in the low-conductivity region of $10^{-9}$ S/m or less or even in the high-resistance region at a surface resistance of $10^{9}\Omega/\square$ or more if the product is in a circular belt shape.

Also in producing a polymer alloy by blending two kinds of polymers less compatible with each other, it is possible according to the present invention to produce a polymer alloy with polymer particles having a particle size of less than 1 µm, dispersed in the polymer alloy.

In the present invention, the polymer mixture is preferably subjected to the space-through (or space passing) treatment in a molten state, but it is possible to obtain the advantageous effects of the present invention by using a kneading system by shear flow such as chaos mixer, Banbury mixer, kneader, roll kneader, screw-type biaxial kneader having a kneader region or a rotor region, or stone-mill kneader.

The space-through treatment is a treatment of getting the polymer mixture through a space between two parallel faces in a molten state, and, in the present invention, the space-through treatment is repeated twice or more, preferably 3 to 1000 times, more preferably 3 to 5 times. Thereby, it is possible in this way to mix and disperse components contained in the polymer mixture sufficiently uniformly. Only one passage through the space is not sufficient for uniform mixing and dispersion. Even if the length of the space in the moving direction of the polymer mixture is elongated, only one passage through the space does not permit sufficiently uniform mixing and dispersion. It is possible to reduce the number of the space-through treatments by kneading the polymer mixture previously in a uniaxial or biaxial kneader, and specifically, if the treatment is carried out continuously in an apparatus equipped at the end portion of a biaxial kneader, it is possible to reduce the number to 3 to 10.

The mechanism for the advantageous effects of the present invention is yet to be understood, but likely the followings. When a polymer mixture enters the space in the molten state, the pressure applied to the polymer mixture and the flow rate of the polymer mixture change significantly. It is likely that a shearing function, an elongation function and a folding function are applied to the molten mixture effectively. Thus, two or more treatments of the polymer mixture may permit sufficient uniform mixing and dispersion of respective components effectively.

The space-through treatment may be carried out by one passage in an apparatus having two or more spaces or repeatedly by two or more passages in an apparatus having only one space. For improvement in the efficiency of continuous operation, the space-through treatment is preferably carried out once in an apparatus having The distance x between the two parallel faces of each of the two or more spaces is independently, preferably 7 mm or less, particularly preferably 0.05 to 7 mm, and it is preferably 0.5 to 5 mm, more preferably 0.5 to 3 mm, for more uniform mixing-dispersion, reduction in size of the apparatus, and prevention of vent up. Passage though a space having excessively small face-to-face distance does not permit sufficiently uniform mixing and dispersion.

The distance y of each of the two or more spaces in the moving direction MD of the polymer mixture is independently 2 mm or more, preferably 3 mm or more, more preferably 5 mm or more, and still more preferably 10 mm or more, for further improvement in processing efficiency. The maximum distance y is not particularly limited, but an excessively long distance leads to deterioration in operational efficiency and increase in the pressure for flow of the polymer mixture in the moving direction MD and is not preferable from economical viewpoints. Therefore, the distance y is independently, preferably 2 to 100 mm, more preferably 3 to 50 mm, and still more preferably 5 to 30 mm.

The distance z of each of the two or more spaces in the width direction WD is not particularly limited, and, for example, 20 mm or more and normally 100 to 1000 mm.

The upper limit is not particularly limited, if the flow rate of the polymer mixture fed through the space in a molten state is 1 g/minute or more per a sectional area of 1 $cm^2$ in obtaining the advantageous effects of the present invention, but an excessively high flow rate leads to expansion in the area needed for installation of the apparatus and is thus uneconomical. It is preferably 10 to 5000 g/minute, more preferably 10 to 500 g/minute.

The flow rate can be calculated by dividing the discharge rate (g/minute) of the polymer mixture from the discharge opening by the space sectional area ($cm^2$).

The viscosity of the polymer mixture during space-passing treatment is not particularly limited, if the flow rate favorable for space-passing is obtained, and can be controlled by adjustment of heating temperature. The viscosity is, for example, 1 to 10000 Pa·s, preferably 10 to 8000 Pa·s.

The viscosity of the polymer mixture can be determined by using a viscoelasticity meter MARS (manufactured by Haake).

The pressure needed for flow of the polymer mixture in the molten state in the moving direction MD is not particularly limited, if the space-passing favorable for the flow rate above is assured, but the resin pressure is preferably 0.1 MPa or more, as pressure difference to atmospheric pressure. The resin pressure is a pressure determined at the position 1 mm or more inside the space from the resin discharge opening, and can be monitored directly with a pressure gauge. The pressure is more effective when it is higher, but an excessive resin pressure may lead to drastic generation of shear heat and consequently to decomposition of the polymer, and thus, the resin pressure is preferably 500 MPa or less, more preferably 50 MPa or less. The resin pressure above is only a guide for production of a polymer composition showing favorable physical properties, and a resin pressure outside the range above may be used, if the object of the present invention is achieved.

The temperature of the polymer mixture during space-passing treatment is not particularly limited, if the flow rate favorable for space-passing is achieved, but, a high temperature of over 400° C. may lead to decomposition of the polymer, and thus, the temperature is recommended to be 400° C. or lower. The polymer mixture temperature is preferably higher than the Tg of the polymer, because the resin pressure can be kept significantly lower. If two or more polymers are used, the weighted average Tg of the mixture calculated from the ratio and their respective Tg values is used. For example, the content of polymer A having a Tg of $Tg_A$ (° C.) is $R_A$ (%) and the content of polymer B having a Tg of $Tg_B$ (° C.) is $R_B$ (%), wherein ($R_A+R_B=100$), Tg is calculated by "($Tg_A \times R_A/100$)+($Tg_B \times R_B/100$)".

The temperature of the polymer mixture during space-passing treatment can be controlled by adjustment of heating temperature of the apparatus for the treatment.

Normally in the present invention, the polymer mixture is melt and kneaded in an extrusion kneader immediately before space-passing treatment, and the polymer mixture extruded after kneading in the molten state is subjected to the space-passing treatment for a particular number of times. The melting-kneading method is not particularly limited, and, for example, any known uniaxial or biaxial extrusion kneader may be used.

The melting-kneading conditions are not particularly limited and, for example, the screw rotation number may be 50 to 1000 rpm, and the melting-kneading temperature may be a temperature close to the temperature of the polymer mixture during the space-passing treatment.

Hereinafter, the space-passing processing method will be described specifically, with reference to drawings showing an apparatus for producing a polymer composition subjected to the space-passing treatment. Such an apparatus for producing the polymer composition has an inflow opening for supply of the polymer mixture to be treated, a discharge opening for discharge of the treated polymer mixture, and two or more spaces between two parallel faces in the flow path formed between the inflow and discharge openings for the polymer mixture to be treated.

Figure 6:
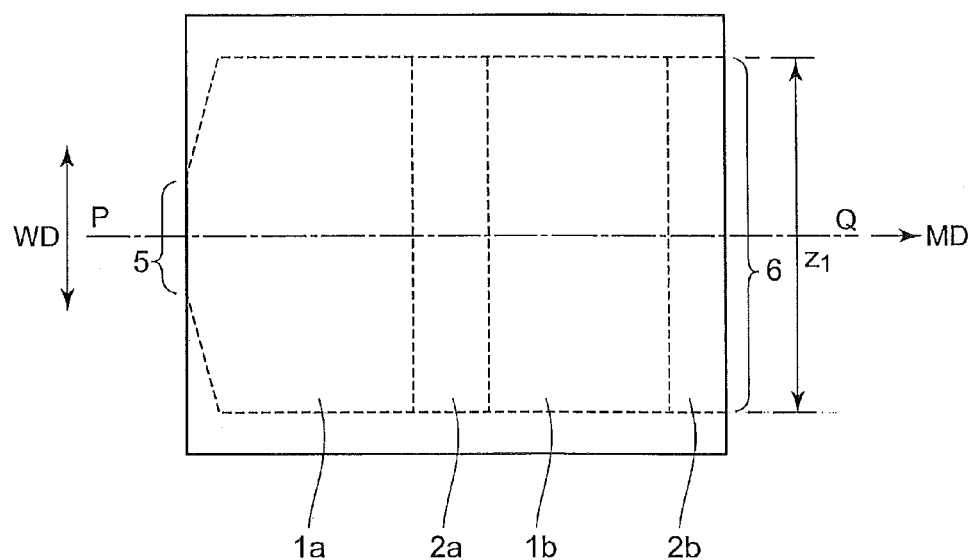
FIG. 6(A) is a schematic perspective view illustrating an example of a production apparatus by the method for producing a polymer composition according to the present invention, seen from the top face through which the interior of the apparatus is seen.
FIG. 6(B) is a schematic sectional view of the apparatus of FIG. 6(A) along the line P-Q.
Figure 6:
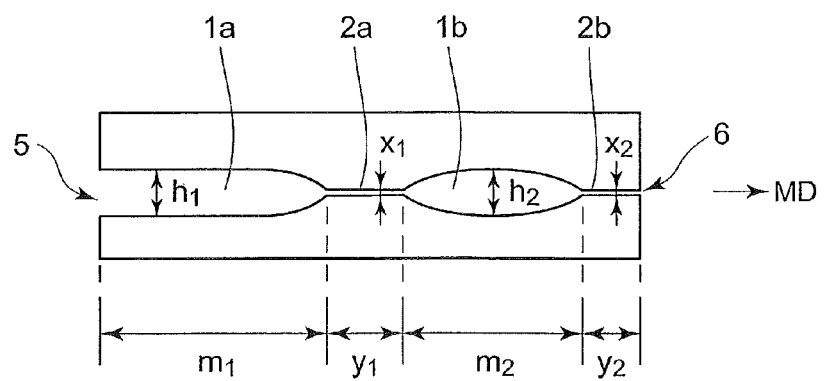

An example of an apparatus for producing a polymer composition by two space-passing treatments is shown in FIG. 6. FIG. 6(A) is a schematic perspective view of an apparatus for producing a polymer composition by two space-passing treatments, as seen from the top face through which the interior of the apparatus is visible, and FIG. 6(B) is a schematic sectional view of the apparatus shown in FIG. 6(A) along the line P-Q.

The apparatus of FIG. 6(A) or 6(B) has an almost rectangular shape as a whole.

In the apparatus of FIG. 6(A) or 6(B), an inflow opening 5 is connected to the discharge opening of an extrusion kneader (not shown in the Figure) so that the extrusion force of the extrusion kneader is used as a force propelling the movement of the polymer mixture in the molten state as a whole through spaces 2a and 2b in the moving direction MD. The apparatus of FIG. 6(A) or 6(B), which is used in this way as connected to the discharge opening of the extrusion kneader, may be called a die.

The apparatus of FIG. 6(A), or 6(B) has, specifically, the inflow opening 5 for supply of the polymer mixture to be treated and a discharge opening 6 for discharge of the treated polymer mixture, and two spaces (2a and 2b) formed of two parallel faces in the flow path for the polymer mixture to be treated between the inflow opening 5 and the discharge opening 6.

It normally has reservoirs 1a and 1b immediately upstream of the spaces 2a and 2b respectively, which have a sectional area larger than that of the space.

The polymer mixture extruded out of the extrusion kneader during treatment is fed in the molten state by the extrusion force of the extrusion kneader through the inflow opening 5 into the reservoir 1a of the apparatus 10A of FIG. 6 (B) and spread in the width direction WD.

Then, the polymer mixture passes through the space 2a continuously in the moving direction MD and in the width direction WD into the reservoir 1b and further passes through the space 2b and is discharged from the discharge opening 6.

In FIG. 6 (A) or (B), the distances $x_1$ and $x_2$ between the two parallel planes of the spaces 2a and 2b correspond to the distance x above, and preferably respectively in a range similar to that of the distance x.

In FIG. 6(A) or 6(B), the distance $y_1$ of the space 2a in the moving direction MD and the distance $y_2$ of the space 2b in the moving direction MD correspond to the distance y above, and respectively, preferably in a range similar to that of the distance y.

In FIG. 6(A) or 6(B), the distance $z_1$, generally a common value, of each of spaces 2a and 2b in the width direction WD corresponds to the distance z and is preferably, in a range similar to that of the distance z.

In FIG. 6(A) or 6(B), the maximum heights $h_1$ and $h_2$ of the reservoirs 1a and 1b are respectively longer than the face-to-face distances $x_1$ and $x_2$ of the spaces 2a and 2b immediately downstream, and normally, independently 3 to 100 mm, preferably 3 to 50 mm.

In FIG. 6(A) or 6(B), the ratio $S_{1a}/S_{2a}$ of the cross-sectional area $S_{2a}$ of the space 2a and the maximum cross-sectional area $S_{1a}$ of the immediately previous reservoir 1a, and the ratio $S_{1b}/S_{2b}$ of the cross-sectional area $S_{2b}$ of the space 2b and the maximum cross-sectional area $S_{1b}$ of the immediately previous reservoir 1b, each independently are 1.1 or more, particularly 1.1 to 1000, and preferably 2 to 100, more preferably 3 to 15, for more uniform mixing and dispersion and reduction in size of the apparatus and for prevention of vent up. An excessively small sectional area ratio prohibits sufficient uniform mixing and dispersion.

In FIG. 6(A) or 6(B), the distance $m_1$ of the reservoir 1a in the moving direction MD and the distance $m_2$ of the reservoir 1b in the moving direction MD each independently are 1 mm or more, preferably 2 mm or more, more preferably 5 mm or more, still more preferably 10 mm or more for improvement in efficiency of continuous operation. The maximum of each of the distances $m_1$ and $m_2$ is not particularly limited, but an excessively large distance leads to deterioration in efficiency and also increase of the extrusion force of the extrusion kneader connected to the inflow opening 5 and is thus uneconomical. Thus, the distances $m_1$ and $m_2$ each independently are preferably 1 to 300 mm, more preferably 2 to 100 mm, a still more preferably 5 to 50 mm.

An example of the apparatus for producing a polymer composition by three space-passing treatments is shown in FIG. 1(A) or 1(B). FIG. 1(A) is a schematic perspective view of an apparatus for producing a polymer composition by two space-passing treatments, as seen from the top face through which the interior of the apparatus is seen, and FIG. 1(B) is a schematic sectional view of the apparatus shown in FIG. 1(A) along the line P-Q.

The apparatus of FIG. 1(A) or 1(B) has an almost rectangular shape as a whole.

In the apparatus of FIG. 1 (A) or FIG. 1(B), an inflow opening 5 is connected to a discharge opening of an extrusion kneader (not shown in the Figure) so that the extrusion force of the extrusion kneader is used as a force propelling the movement of the polymer mixture in the molten state as a whole through spaces 2a, 2b and 2c in the moving direction MD. The apparatus of FIG. 1 (A) or FIG. 1(B), which is also used in this way as connected to the discharge opening of the extrusion kneader, may be called a die.

The apparatus of FIG. 1 (A) or (B) has, specifically, an inflow opening 5 for supply of the polymer mixture to be treated and a discharge opening 6 for discharge of the treated polymer mixture, and the three spaces (2a, 2b, and 2c) between two parallel planes for processing of polymer mixture that are placed between the inflow opening 5 and the discharge opening 6. It normally has reservoirs 1a, 1b and 1c immediately upstream of the spaces 2a, 2b and 2c, respectively, the reservoir having a sectional area larger than that of the space. The polymer mixture extruded out of an extrusion kneader during treatment is fed in a molten state by extrusion force of the extrusion kneader through the inflow opening 5 into the reservoir 1a of the apparatus 10A of FIG. 1 (A), (B) and spread in the width direction WD. Then, the polymer mixture passes through the space 2a continuously in the moving direction MD and in the width direction WD into the reservoir 1b, further through the space 2b into the reservoir 1c and finally through the space 2c, and is discharged from the discharge opening 6.

The apparatus of FIG. 1(A) or 1(B) used in production of the polymer composition has the following dimension.

In FIG. 1, the distances $x_1$, $x_2$ and $x_3$ between the two parallel planes respectively of the spaces 2a, 2b and 2c each correspond to the distance x, and may be independently in a range similar to that of the distance x.

In FIG. 1(A) or 1(B), the distance $y_1$ of the space $2a$ in the moving direction MD, the distance $y_2$ of the space $2b$ in the moving direction MD and the distance $y_3$ of the space $2c$ in the moving direction MD each correspond to the distance y and may be independently in a range similar to that of the distance y.

In FIG. 1(A) or 1(B), the distance $z_1$, generally a common value, of each of the spaces $2a$, $2b$ and $2c$ in the width direction WD corresponds to the distance z and may be in a range similar to that of the distance z.

In FIG. 1(A) or 1(B), the maximum heights $h_1$, $h_2$ and $h_3$ of the reservoirs $1a$, $1b$ and $1c$ are respectively longer than the face-to-face distances $x_1$, $x_2$ and $x_3$ of the spaces $2a$, $2b$ and $2c$ immediately downstream, and normally in a range similar to those of the maximum heights $h_1$ and $h_2$ in FIG. 6 (B) independently.

In FIG. 1(A) or 1(B), the ratio $S_{1a}/S_{2a}$ of the cross-sectional area $S_{2a}$ of the space $2a$ and the maximum cross-sectional area $S_{1a}$ of the adjacent reservoir $1a$, the ratio $S_{1b}/S_{2b}$ of the cross-sectional area $S_{2b}$ of the space $2b$ and the maximum cross-sectional area $S_{1b}$ of the adjacent reservoir $1b$, and the ratio $S_{1c}/S_{2c}$ of the cross-sectional area $S_{2c}$ of the space $2c$ and the maximum cross-sectional area $S_{1c}$ of the adjacent reservoir $1c$, may be in a range similar to those of $S_{1a}/S_{2a}$ and $S_{1b}/S_{2b}$ in FIG. 6(A) or 6(B).

In FIG. 1(A) or 1(B), the distance $m_1$ of the reservoir $1a$ in the moving direction MD, the distance $m_2$ of the reservoir $1b$ in the moving direction MD, and the distance $m_3$ of the reservoir $1c$ in the moving direction MD each independently are in a range similar to those of the distances $m_1$ and $m_2$ in FIG. 6(A) or 6(B).

In the present description, the term "parallel" is a concept including not only the parallel relationship between two flat faces but also that between two curved faces. Specifically, the spaces $2a$, $2b$ and $2c$ shown in FIG. 6(A) or 6(B) and 1(A) or a (B) consist of two parallel planes, but are not limited thereto, and may have two parallel curved faces, as the space $2a$ shown in FIG. 7(A) or 7(B) or the spaces $2a$, $2b$ and $2c$ in FIG. 8. The term "parallel" means that the distance between the corresponding two faces is constant, but the distance may not be strictly "constant" and may be substantially "constant", taking the precision in production of the apparatus into consideration. Thus, the term "parallel" may be "approximately parallel", if the object of the present invention is achieved. In an apparatus approximately in rectangular shape, the shape and the position of the space in cross section vertical to the width direction WD is constant in the width direction. In an apparatus in the approximately cylindrical shape, the shape and the position of the space in cross section along the axis is constant in the peripheral direction.

Figure 7:
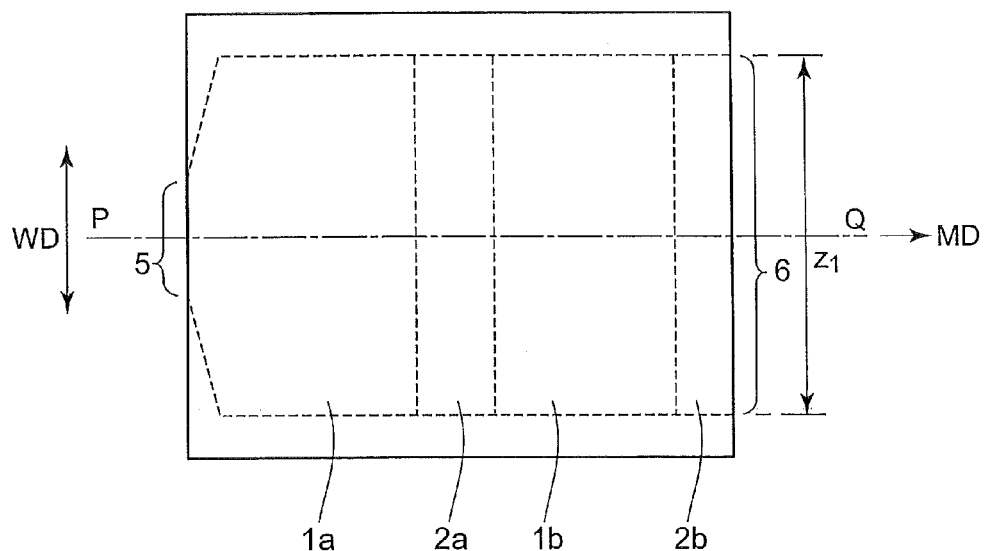
FIG. 7(A) is a schematic perspective view illustrating an example of a production apparatus by the method for producing a polymer composition according to the present invention, seen from the top face through which the interior of the apparatus is seen.
FIG. 7(B) is a schematic sectional view of the apparatus of FIG. 7(A) along the line P-Q.
Figure 7:
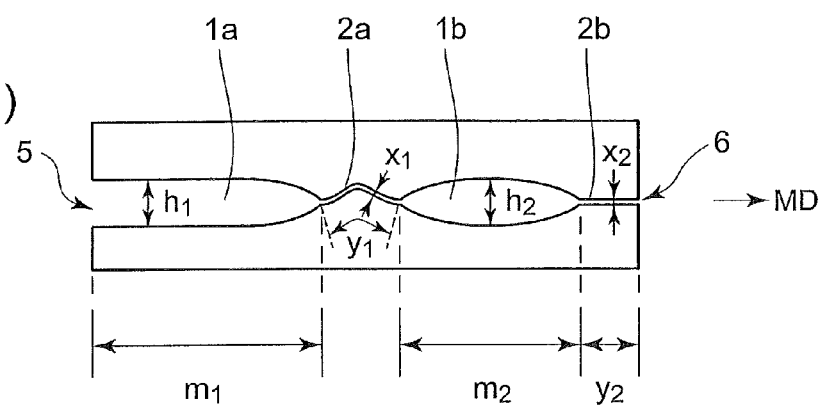

FIG. 7(A) or 7(B) shows an example of the apparatus for producing a polymer composition by two space-passing treatments. FIG. 7(A) is a schematic perspective view of an apparatus for producing a polymer composition by two space-passing treatments, seen from the top face through which the interior of the apparatus is seen, and FIG. 7(B) is a schematic sectional view of the apparatus shown in FIG. 7(A) along the line P-Q. The apparatus of FIG. 7(A) or 7(B) has an almost rectangular shape as a whole. In the apparatus of FIG. 7, an inflow opening 5 is connected to a discharge opening of an extrusion kneader (not shown in the Figure) so that the extrusion force of the extrusion kneader is used as a force propelling the movement of the polymer mixture in a molten state as a whole through spaces $2a$ and $2b$ in the moving direction MD. The apparatus of FIG. 7(A) or 7(B), which is used in this way as connected to the discharge opening of the extrusion kneader, may be called a die.

The apparatus of FIG. 7 (A) or 7(B) is the same as the apparatus of FIG. 6 (A) or 6 (B), except that the space $2a$ has two parallel curved faces, and thus detailed description of the apparatus of FIG. 7(A) or 7(B) is omitted.

FIG. 8(A) or 8(B) shows an example of an apparatus for producing a polymer composition by three space-passing treatments. FIG. 8(A) is a schematic perspective view of an apparatus for producing a polymer composition by three space-passing treatments, and FIG. 8(B) is a schematic sectional view of the apparatus of FIG. 8(A) along the line P-Q. The apparatus of FIG. 8(A) or 8(B) has an almost cylindrical shape as a whole, and thus, the apparatus can be reduced in size. In the apparatus of FIG. 8(A) or 8(B), an inflow opening 5 is connected to a discharge opening of an extrusion kneader (not shown in the Figure) so that the extrusion force of the extrusion kneader is used as a force propelling the movement of the polymer mixture in a molten state as a whole through the spaces $2a$, $2b$ and $2c$ in the moving direction MD. The apparatus of FIG. 8(A) or 8(B), which is used in this way as connected to the discharge opening of the extrusion kneader, may be called a die.

The apparatus of FIG. 8(A) or 8(B) has, specifically, an inflow opening 5 for supply of the polymer mixture to be treated and a discharge opening 6 for discharge of the treated polymer mixture, and three spaces ($2a$, $2b$, and $2c$) formed of two parallel faces in the flow path of the polymer mixture to be treated between the inflow opening 5 and the discharge opening 6. It normally has reservoirs $1a$, $1b$ and $1c$ immediately upstream of the spaces $2a$, $2b$ and $2c$, the reservoirs having a sectional area larger than that of the respective space immediately downstream. The polymer mixture extruded out of the extrusion kneader during treatment is fed in a molten state by the extrusion force of the extrusion kneader through the inflow opening 5 into the reservoir $1a$ of the apparatus 10D of FIG. 8(A) or 8(B) and spread in the radius direction. Then, the polymer mixture passes through the space $2a$ continuously in the moving direction MD and in the peripheral direction PD into the reservoir $1b$, further through the space $2b$ into the reservoir $1c$ and finally through the space $2c$, and is discharged from the discharge opening 6.

In FIG. 8(A) or 8(B), the distances $x_1$, $x_2$ and $x_3$ between the two parallel faces respectively of the spaces $2a$, $2b$ and $2c$ correspond to the distance x above, and are in a range similar to that of the distance x independently.

In FIG. 8(A) or 8(B), the distance $y_1$ of the space $2a$ in the moving direction MD, the distance $y_2$ of the space $2b$ in the moving direction MD and the distance $y_3$ of the space $2c$ in the moving direction MD correspond to the distance y above, and are in a range similar to that of the distance y independently.

In FIG. 8(A) or 8(B), the maximum height $h_1$ of the reservoir $1a$ is not particularly limited, but normally 1 to 100 mm, preferably 1 to 50 mm.

Figure 8:
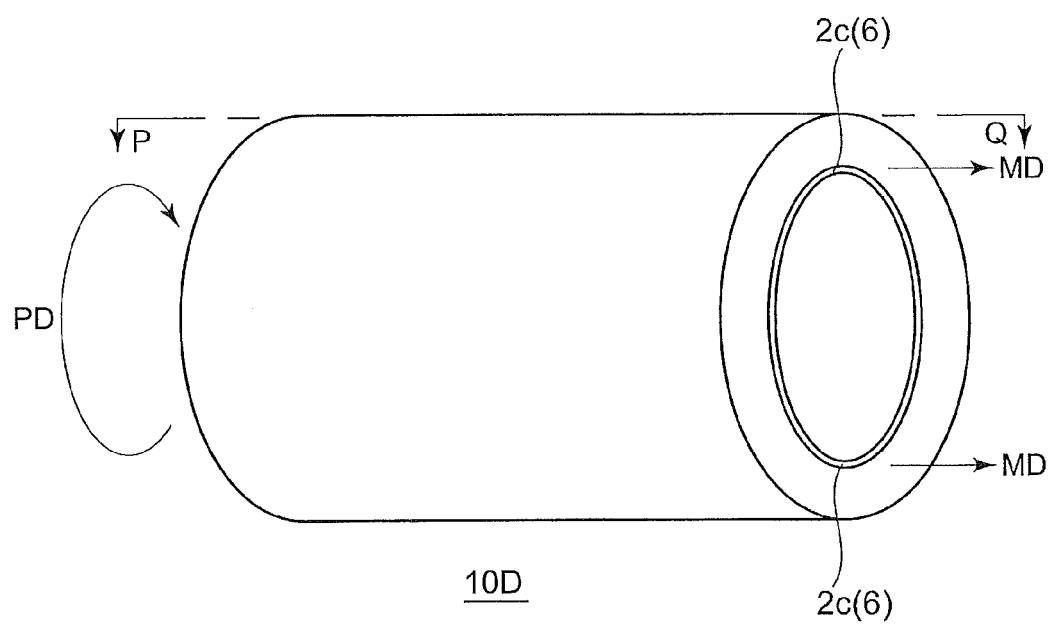
FIG. 8(A) is a schematic perspective view illustrating an example of a production apparatus by the method for producing a polymer composition according to the present invention.
FIG. 8(B) is a schematic sectional view of the apparatus of FIG. 8(A) along the line P-Q.
Figure 8:
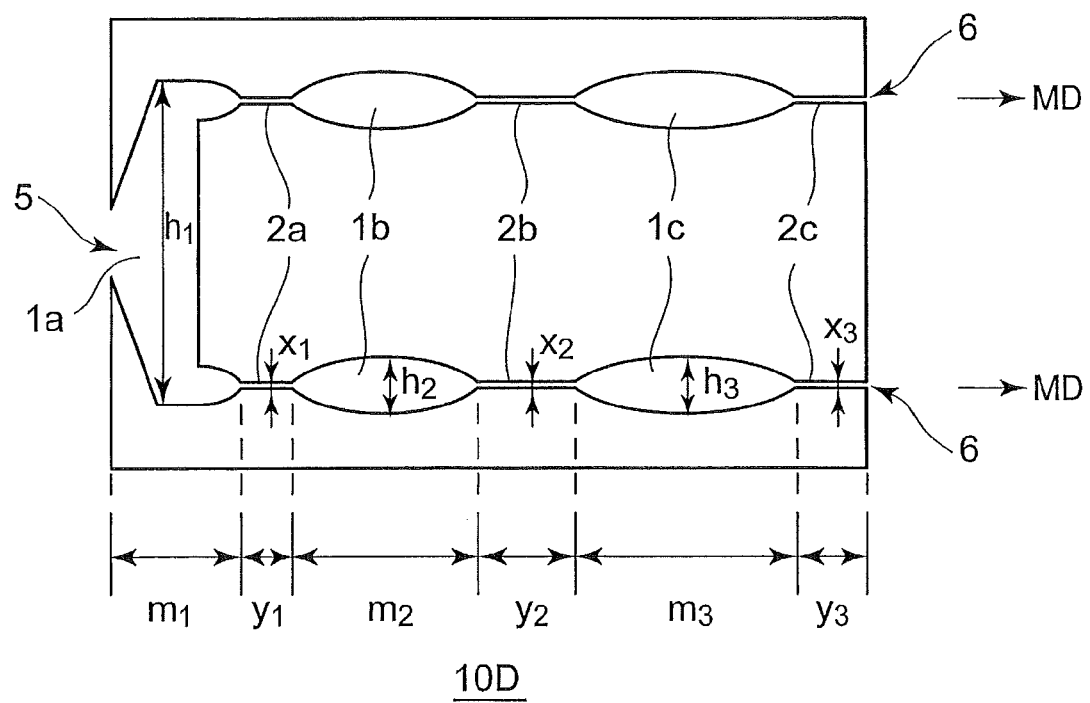

In FIG. 8 (A) or 8(B), the maximum heights $h_2$ and $h_3$ of the reservoirs $1b$ and $1c$ are respectively longer than the face-to-face distances $x_2$ and $x_3$ of the spaces $2b$ and $2c$ immediately downstream, and normally in a range similar to that of the maximum heights $h_1$ and $h_2$ in FIG. 6(A) or 6(B).

In the present description, the maximum height of the reservoir means the maximum height in the diameter direction on the cross section along the axis of the apparatus, in the case of an apparatus approximately in cylindrical shape.

In FIG. 8 (A) or 8(B), the ratio $S_{1a}/S_{2a}$ of the cross-sectional area $S_{2a}$ of the space $2a$ and the maximum cross-sectional area $S_{1a}$ of the immediately preceding reservoir $1a$, is 1.2 or more, particularly 1.2 to 10, and it is preferably 1.2 to 7, more preferably 1.2 to 5, for more uniform mixing-dispersion and reduction in size of the apparatus and for prevention of vent up. An excessively small sectional area ratio prohibits sufficiently uniform mixing-dispersion.

In FIG. 8 (A) or 8(B), the ratio $S_{1b}/S_{2b}$ of the cross-sectional area $S_{2b}$ of space $2b$ and the maximum cross-sectional area $S_{1b}$ of the immediately preceding reservoir $1b$, and the ratio $S_{1c}/S_{2c}$ of the cross-sectional area $S_{2c}$ of the space $2c$ and the maximum cross-sectional area $S_{1c}$ of the immediately preceding reservoir $1c$ are independently in a range similar to those of $S_{1a}/S_{2a}$ and $S_{1b}/S_{2b}$ in FIG. 6(a) or 6(B).

In FIG. 8(A) or 8(B), the distance $m_1$ of the reservoir $1a$ in the moving direction MD, the distance $m_2$ of the reservoir $1b$ in the moving direction MD, and the distance $m_3$ of the reservoir $1c$ in the moving direction MD are independently in a range similar to those of distances $m_1$ and $m_2$ in FIG. 6(A) or 6(B).

The apparatuses shown in FIGS. 1 and 6 to 8 are produced with materials used in production of conventional dies that have been normally used to be connected to the discharge opening in the fields of kneading machines and extrusion apparatuses for resin.

After space-passing treatment, the polymer mixture processed is cooled rapidly. The state of various components mixed and dispersed sufficiently uniformly after the space-passing treatment is preserved effectively.

Rapid cooling can be carried our by immersing the polymer composition obtained by space-passing treatment in a molten state directly in water at 0 to 60° C. Alternatively, rapid cooling may be carried out with gas at −40° C. to 60° C. or in contact with metal at −40° C. to 60° C. Rapid cooling is not particularly needed, and, for example, just standing for cooling can achieve preservation of the state of various components mixed and dispersed sufficiently uniformly.

The cooled polymer composition may be pelletized by pulverization for easier handling in the following step.

In the present invention, at least part of the components for the polymer mixture may be mixed previously before the melting-kneading treatment, which is immediately before the space-passing treatment of the polymer mixture. For example, if a polymer composition containing two or more polymers and additives is produced, at least one kind of polymer and the additives may be mixed and then the other polymers are added. Then, the melting-kneading treatment immediately before space-passing treatment is carried out, before the space-passing treatment repeated specific times. Alternatively, for example, all components may be mixed previously, and then subjected to melting-kneading treatment immediately before space-passing treatment and further to the space-passing treatment repeated specific times. It is possible in this way to mix and disperse various components more effectively.

As for the mixing method, particular components may be dry-blended, or particular components may be melt-kneaded, cooled and pulverized by a conventional melting-kneading method. If the melting-kneading method is used, an extrusion kneader similar to that described above may be used, and the extrusion kneader may be used with its discharge opening connected to a conventional known die.

The production method and the production apparatus of the polymer composition may be applied to production not only of a polymer mixture containing a PPS resin, but also of a polymer mixture containing no PPS resin. In this case, the polymer mixture is a mixture of two kinds of compounds containing at least one kind of polymer. The polymer contained in the polymer mixture is not particularly limited, and may be a known polymer.

The glass transition point of the polymer is not particularly limited, if the viscosity of the polymer mixture during the space-through treatment can be controlled in the range described below by heating, and it is, for example, −70 to 300° C., preferably 10 to 250° C.

The two or more kinds of polymers contained in the polymer mixture are selected from thermoplastic resins, elastomers, and thermoplastic elastomers (TPE). An example thereof is a combination selected from the polymers described in Polymer ABC Handbook edited by the Polymer ABC Study Group of The Society of the Polymer Science, Japan (NTS), including polyethylene (PE), polypropylene (PP), ethylene-vinyl acetate copolymers (EVA), polyvinylalcohol (PVA), polyethylene terephthalate (PET), polyvinylidene chloride (PVDC), polyvinyl chloride (PVC), polystyrene (PS), ABS resins (ABS), AS resins (AS), acrylic resins (PMMA), nylon (polyamide, PA), polyacetal (POM), polyphenylene oxide (PPO), polybutylene terephthalate (PBT), polycarbonate (PC), modified polyphenyleneethers (m-PPE), polyphenylene sulfide (PPS), polyether ether ketone (PEEK), fluororesin (FR), polyarylate (PAR), polysulfone (PSF), polyether sulfone (PES), polyether imide (PEI), polyamide-imide (PAI), polyimide (PI), natural rubber, (NR), polybutadiene (BR), polystyrene butadiene (SBR), polyisoprene (IR), polytetrafluoroethylene (PTFE), polyketonesulfide (PKS), tetra methyl polycarbonate (TMPC), methyl methacrylate (MMA), acrylonitrile butadiene rubber (NBR), thermoplastic polyurethane rubbers and the like.

Examples of effective combinations include PPS+PA, PPS+PTFE, PPS+PPE, PPS+PES, PPS+PEEK, PPS+PAI, PPS+PSF, PPS+PKS, PPS+PC, PPS+PEI, combinations of PPS and a polyester resin such as PPS+PET, combinations of PPS and a polyolefin resin such as PPS+PE, combinations of PPS and an epoxy resin, PE+PMMA, PE+EVA, combinations of PS and a polyolefin resin such as PS+PE, PS+PVC, PS+PPE, PS+TMPC, AS+TMPC, AS+PMMA, AS+PVC, AS+MMA, PC+ABS, PC+PS, PC+PA, PC+PMMA, PC+PBT, PC+PET, combination of PA and a polyolefin resin such as PA+PE, PA+PPO, PVC+EVA, combination of PVC and a polyolefin resin such as PVC+PE, PVC+NBR, PVC+TPFE, PP+PE, PP+nitrile rubber and the like, and it is possible, even without addition of a compatibilizer that is normally needed, to obtain favorable results such as favorable higher-order structure of polymer by using the method according to the present invention.

In particular, the advantageous effects of the present invention can be obtained distinctively in the combination of PPS+PA, PC+ABS in the above.

In the combinations above, these polymers are generally less compatible to each other and it is thus difficult to mix and disperse them sufficiently uniformly, but these polymers can be mixed and dispersed sufficiently uniformly by the method of the present invention.

In the combinations above, it is possible to mix and disperse the polymers uniformly without any particular limitation on the ratio of the various resins.

For example, the content ratio of polycarbonate resin/ABS resin can be set to 20/80 to 80/20, in particular 20/80 to 60/40 by weight.

(Molded Article)

Because the polymer composition according to the present invention contains various components solubilized and dispersed sufficiently uniformly, molded articles produced by using the polymer composition according to the present invention are also sufficiently uniform in compatibility/dispersibility of the various components. Thus if the molded article according to the present invention is heat-treated, there is almost no change in the glass transition temperature between before and after the heat treatment. Specifically when the glass transition temperature of a molded article before heat treatment is designated as $Tg_{11}$ and that of the treated molded article after heat treatment as $Tg_{12}$, the difference, specifically $Tg_{11}$-$Tg_{12}$, is 3° C. or lower, in particular −3 to 3° C., preferably 0 to 3° C. Because a molded article having a Tg difference of more than 3° C. contains various components that are solubilized and dispersed unfavorably, the wastes from molded article or those generated in the production process cannot be used as raw materials when recycling. In addition, molded articles having a Tg difference between before and after heat treatment not in the range above do not show a sufficient high toughness. Even if additives are added, the additives are not dispersed sufficiently uniformly in the molded article. Thus, when the molded article is a transferring belt used in an image-forming apparatus in the electrophotographic process and the additive is a conductive substance such as carbon, the resulting transferring belt does not show sufficient uniform conductivity.

The polymer composition according to the present invention produced by the method above, if processed by a known molding method such as injection molding, extrusion molding, compression molding, blow molding or injection compression molding, can give molded articles arbitrary shape. Examples of the shapes of the molded article include belt (in particular, seamless circular belt), film, pipe, fiber and the like. The preferable molding method is particularly injection molding or extrusion molding.

It is preferable in the present invention to carry out rapid cooling after molding in any molding method, because sufficiently uniform mixing and dispersing forms of various components achieved in the polymer composition can be maintained more effectively in the molded article.

In particular, the polymer composition according to the present invention normally contains a conductive substance when it is used for production of an electrophotographic transferring belt. The polymer composition according to the present invention and the molded article produced by using the composition improves in uniformity in dispersion of the additives, and thus, if a conductive substance is added, it is dispersed uniformly. As a result, the molded article is entirely uniform in conductivity. Particularly when the molded article is a seamless circular transferring belt for electrophotography, the transferring belt can have a relatively uniform electric resistance in the peripheral direction.

Molded articles according to the present invention can be applied to various applications. Examples of such applications are listed below: Examples include: electrical device parts such as generator, motor, voltage transformer, current transformer, voltage regulator, rectifier, inverter, electric relay, plug socket, electrical switch, circuit breaker, knife switch, electrode rod, and electric parts cabinet; electronic parts such as sensor, LED lamp, connector, socket, resistor, relay case, small switch, coil bobbins, capacitor, variable capacitor case, optical pickup, radiator, various terminal strip, transformer, plug, printed wiring board, tuner, speaker, microphone, headphone, small motor, magnetic head base, power module, semiconductor, liquid crystal, FDD carriage, FDD housing, motor brush holder, parabolic antenna, and computer-related parts; household and office electric product parts such as VTR parts, television parts, iron, hair drier, rice cooker parts, microwave oven parts, acoustic parts, voice device parts such as audio-laser disk and compact disk, illumination parts, refrigerator parts, air conditioner parts, typewriter parts, and word processor parts; machine-related parts such as office computer-related parts, telephone-related parts, facsimile-related parts, copying machine-related parts, cleaning jigs, motor parts, writer, and typewriter; optical-device and precision machine-related-parts such as microscope, binoculars, camera, and clock; automobile vehicle-related parts such as alternator terminal, alternator connector, IC regulator, potentiometer base for light dayer, various valves such as, exhaust gas valve, fuel related exhaust/suction system pipes, air intake nozzle snorkel, intake manifold, fuel pump, engine cooling water joint, carburetor main body, carburetor spacer, exhaust gas sensor, cooling water sensor, oil-temperature sensor, brake padware sensor, throttle position sensor, crank shaft position sensor, air flow meter, brake padware sensor, air-conditioner thermostat base, air-conditioning flow control valve, radiator-motor brush holder, water pump impeller, turbine vane, wiper motor relationship parts, distributor, starter switch, starter relay, transmission wire harness, window washer nozzle, air conditioner panel switch plate, fuel-related electromagnetic valve coil, fuse connector, horn terminal, electrical components insulation plate, stepping motor and rotor, lamp socket, lamp reflector, lamp housing, brake piston, solenoid bobbin, engine oil filter, ignition device case; and the like.

Combined use of the polymer composition according to the present invention with a conductive substance, particularly carbon, in production of an electrophotographic transferring belt, is more effective in obtaining the advantageous effects of the present invention. It was difficult to disperse a conductive substance uniformly in electrophotographic transferring belt, but in the present invention, it is dispersed uniformly and easily. The electrophotographic transferring belt may be an intermediate transferring belt for receiving a toner image formed on photosensitive drum on its surface and retransferring the transferred toner image onto a recording medium such as paper, or a direct transferring belt for receiving paper on its surface by electrostatic force and transferring a toner image formed on photosensitive drum onto the paper.

The transferring belt has preferably a seamless circular shape. Transferring belts in such a shape often contain the conductive substance in greater amount and thus, become electrically less resistant in the molten resin-merging region compared to other regions in circular die during molding, but the transferring belt according to the present invention has an electric resistance in such a merging region similar to those in other regions.

The transferring belt formed of the polymer composition above may be used as it is, but hardening of the surface for improvement in transfer efficiency is more effective in obtaining the advantageous effects of the present invention. The surface-hardening method is, for example, a method of coating an inorganic material, but it is not particularly limited thereto. For example, such known methods as physicochemical methods, such as CVD, PVD and plasma coating, are usable. The inorganic material coated on the surface is not particularly limited, if the object of the present invention is obtained, but, considering the physical properties and cost effectiveness, oxide-based materials containing Si, Al and C are particularly preferable. For example, amorphous silica thin film, amorphous alumina thin film, amorphous silica alumina thin film, amorphous diamond thin film and the like are recommended. Coating of a belt with such an inorganic thin film having relatively high hardness improves abrasion resistance to blades and transfer efficiency.

The transferring belt is a transferring belt for use in image-forming apparatuses in the intermediate transfer system, in particular a seamless belt without joint line. The transferring belt can be used, for example, a monocolor image-forming apparatus equipped with a single color toner in a developing device, a cyclic full-color image-forming apparatus in which respective developing devices for Y (yellow), M (magenta), C (cyan), an B (black) are provided around one electrostatic latent image-supporting member and the developing on the electrostatic latent image-supporting member and the primary transfer of toner images onto the transferring belt is carried out by every developing device, and a tandem full-color image-forming apparatus in which image-forming units in each color provided with one developing device to one latent image-supporting member
are aligned in series and the developing on the electrostatic latent image-supporting member and the primary transfer of toner images onto the transferring belt is carried out by every image forming unit. It is possible to obtain an image-forming apparatus resistant to hollow defects of characters and scattering of toner, by using the transferring belt according to the present invention.

Figure 9:
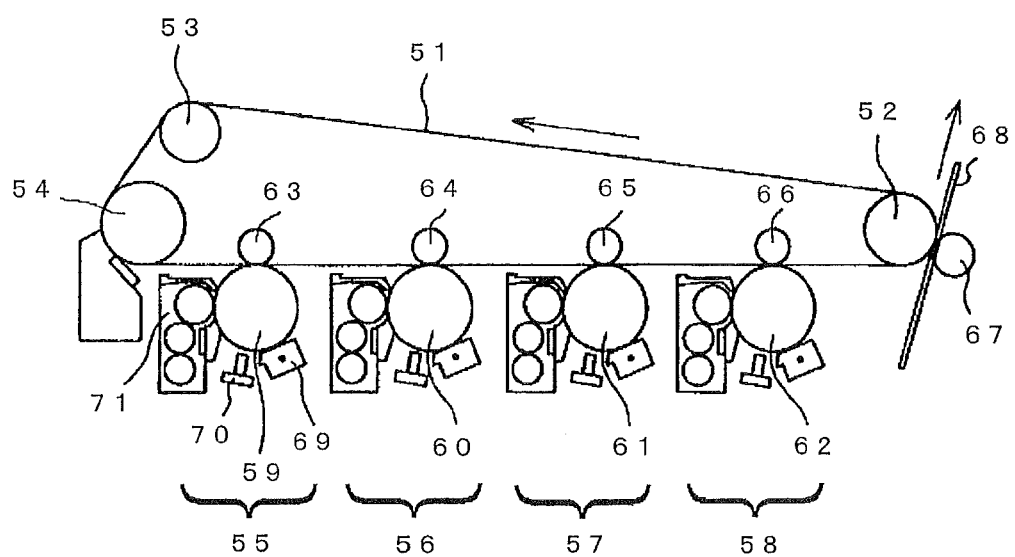
FIG. 9 is a schematic configuration view illustrating an example of an image-forming apparatus for explaining the application of the polymer composition according to the present invention.

For example in the tandem full-color image-forming apparatus shown in FIG. 9, the transferring belt 1 is stretched by multiple rollers 52, 53, 54 and others, and image-forming units 55, 56, 57 and 58 for Y (yellow), M (magenta), C (cyan) and B (black) are installed in series along the transferring belt 51. The transferring belt 51 revolves in the direction indicated by the arrow, and a toner image formed on each latent image-supporting member (photosensitive drum) (59, 60, 61 or 62) is primary-transferred sequentially onto the transferring belt 51 by a primary transfer roller (63, 64, 65 or 66) in each image-forming unit. Then, the 4 color toner images formed on the transferring belt 51 are secondary-transferred onto a recording medium (recording paper) 68 between a secondary transfer roller 67 and a pressure roller 52.

In each image-forming unit (55, 56, 57 or 58), the latent image-supporting member (59, 60, 61 or 62) is charged electrically on the surface by an electrostatic charger (e.g., 69), and an electrostatic latent image is formed thereon by a light-irradiating device (e.g., 70). The electrostatic latent image formed is then developed by a developing device (e.g., 71); the toner image is transferred by a primary transfer roller (e.g., 63) onto the transferring belt; and the residual toner is removed, for example, by a cleaner not shown in the Figure.

EXAMPLES

Example 1

A mixture of 84 kg of PPS (polyphenylene sulfide; manufactured by Toray Industries Inc., Tg=97° C.) and 10 kg of acidic carbon (manufactured by Degussa) was melt and kneaded-in a biaxial extrusion kneader under the condition of an internal temperature of 270° C. and a discharge rate of 30 kg/hour (premixing step). The die of the extrusion kneader used was a strand die extruding a rod-shaped strand having a diameter of 5 mm. The kneaded material was then cooled rapidly by immersing it in water at 30° C. and pelletized to give a polymer composition.

A mixture of 94 kg of the polymer composition and 6 kg of 6 nylon (manufactured by Toray Industries Inc., Tg: 48° C.) was melt and kneaded in a biaxial extrusion kneader (KTX46; manufactured by Kobe Steel, Ltd) having the die shown in FIGS. 1(A) and 1(B) connected to the discharge opening, under the condition of an internal temperature of 270° C., a discharge rate of 30 kg/hour and a resin pressure of 4 MPa (kneading step and space-passing step). Specifically, the polymer composition extruded out of the biaxial extrusion kneader in the molten state was fed through the inflow opening 5 into the reservoir 1a and then through the space 2a into the reservoir 1b in the die 10 shown in FIGS. 1(A) and 1(B). It was then fed through the space 2b into reservoir 1c and finally through the space 2c. The flow rate in the space 2c was 83.3 g/minute per 1 $cm^2$ of space sectional area. The kneaded material extruded out of the space 2c was cooled rapidly by immersing in water at 30° C. and pulverized into pellet-like shape by a pelletizer, to give a polymer composition. The Tg of the polymer composition was determined.

The die shown in FIGS. 1(A) and 1(B) having the following dimension was used, as heated to a temperature similar to the internal temperature of the biaxial extrusion kneader.

Reservoir 1a; maximum height $h_1$: 10 mm, maximum cross-sectional area $S_{1a}$: 30 $cm^2$, and moving direction distance $m_1$: 2 mm;

Space 2a; face-to-face distance $x_1$: 2 mm, cross-sectional area $S_{2a}$: 6 $cm^2$, moving direction distance $y_1$: 30 mm, and width direction distance $z_1$: 300 mm;

Reservoir 1b; maximum height $h_2$: 10 mm, maximum cross-sectional area $S_{1b}$: 30 $cm^2$, and moving direction distance $m_2$: 20 mm;

Space 2b; face-to-face distance $x_2$: 2 mm, cross-sectional area $S_{2b}$: 6 $cm^2$, moving direction distance $y_2$: 30 mm, and width direction distance $z_1$: 300 mm;

Reservoir 1c; maximum height $h_3$: 10 mm, maximum cross-sectional area $S_{1c}$: 30 $cm^2$, and moving direction distance $m_3$: 20 mm;

Space 2c; face-to-face distance $x_3$: 2 mm, cross-sectional area $S_{2c}$: 6 $cm^2$, and moving direction distance $y_3$: 30 mm.

The polymer composition obtained was extrusion-molded at a temperature of 290° C. in a quenchable molding machine having circular die heated to 290° C. and a sizing die for cooling adjusted to 75° C., to give a seamless circular intermediate transferring belt (thickness: 0.1 mm) (film-forming step). The surface resistance of the intermediate transferring belt in the peripheral direction was determined at 24 points at an interval of 20 mm, by using an ohm meter (Hiresta; manufactured by Mitsubishi Chemical K.K.), showing an average of $2 \times 10^{10} \Omega/\square$ and a resistance dispersion in the peripheral direction of $10^{0.2}$. The resistance dispersion in the peripheral direction is a value of the maximum/minimum ratio observed. The measurement voltage for the surface resistance was 500 V and the measurement period was 10 seconds.

The MIT value was determined. The MIT value was determined by using a MIT rub-fatigue tester (MIT-D; manufactured by Toyo Seiki Seisaku-Sho, Ltd) under the conditions of a load of 250 g, a folding angle of 90°, and a frequency of 175 times/minute. The value is the folding number at break, and the average of five samples.

Example 2

An intermediate transferring belt was produced and evaluated in a manner similar to Example 1, except that a die shown in FIGS. 1(A) and 1(B) having the dimension shown below was used. The Tg of the resulting polymer composition before molding was determined. The flow rate in the space 2c was 166.7 g/minute per 1 $cm^2$ of space sectional area.

Reservoir 1a; maximum height $h_1$: 10 mm, maximum cross-sectional area $S_{1a}$: 30 $cm^2$, and moving direction distance $m_1$: 20 mm;

Space 2a; face-to-face distance $x_1$: 1 mm, cross-sectional area $S_{2a}$: 3 $cm^2$, moving direction distance $y_1$: 2 mm, and width direction distance $z_1$: 300 mm;

Reservoir $1b$; maximum height $h_2$: 10 mm, maximum cross-sectional area $S_{1b}$: 30 cm², and moving direction distance $m_2$: 20 mm;
Space $2b$; face-to-face distance $x_2$: 1 mm, cross-sectional area $S_{2b}$: 3 cm², moving direction distance $y_2$: 2 mm, and width direction distance $z_1$: 300 mm;
Reservoir $1c$; maximum height $h_3$: 10 mm, maximum cross-sectional area $S_{1c}$: 30 cm², and moving direction distance $m_3$: 20 mm;
Space $2c$; face-to-face distance $x_3$: 1 mm, cross-sectional area $S_{2c}$: 3 cm², moving direction distance $y_3$: 2 mm, and width direction distance $z_1$: 300 mm.

Example 3

An intermediate transferring belt was produced and evaluated in a manner similar to Example 1, except that a die shown in FIGS. 1(A) and 1(B) having the dimension shown below was used. The Tg of the resulting polymer composition before molding was determined. The flow rate in the space $2c$ was 166.7 g/minute per 1 cm² of space sectional area.
Reservoir $1a$; maximum height $h_1$: 10 mm, maximum cross-sectional area $S_{1a}$: 30 cm², and moving direction distance $m_1$: 10 mm;
Space $2a$; face-to-face distance $x_1$: 1 mm, cross-sectional area $S_{2a}$: 3 cm², moving direction distance $y_1$: 2 mm, and width direction distance $z_1$: 300 mm;
Reservoir $1b$; maximum height $h_2$: 10 mm, maximum cross-sectional area $S_{1b}$: 30 cm², and moving direction distance $m_2$: 10 mm;
Space $2b$; face-to-face distance $x_2$: 1 mm, cross-sectional area $S_{2b}$: 3 cm², moving direction distance $y_2$: 2 mm, and width direction distance $z_1$: 300 mm;
Reservoir $1c$; maximum height $h_3$: 10 mm, maximum cross-sectional area $S_{1c}$: 30 cm², and moving direction distance $m_3$: 10 mm;
Space $2c$; face-to-face distance $x_3$: 1 mm, cross-sectional area $S_{2c}$: 3 cm², moving direction distance $y_3$: 2 mm, and width direction distance $z_1$: 300 mm.

Example 4

An intermediate transferring belt was produced and evaluated in a manner similar to Example 1, except that a die shown in FIGS. 6(A) and 6(B) having the dimension shown below was used. The flow rate in the space $2b$ was 83.3 g/minute per 1 cm² of space sectional area. The Tg of the resulting polymer composition before molding was determined.
Reservoir $1a$; maximum height $h_1$: 10 mm, maximum cross-sectional area $S_{1a}$: 30 cm², and moving direction distance $m_1$: 50 mm;
Space $2a$; face-to-face distance $x_1$: 2 mm, cross-sectional area $S_{2a}$: 6 cm², moving direction distance $y_1$: 10 mm, and width direction distance $z_1$: 300 mm;
Reservoir $1b$; maximum height $h_2$: 10 mm, maximum cross-sectional area $S_{1b}$: 30 cm², and moving direction distance $m_2$: 50 mm;
Space $2b$; face-to-face distance $x_2$: 2 mm, cross-sectional area $S_{2b}$: 6 cm², moving direction distance $y_2$: 10 mm, and width direction distance $z_1$: 300 mm.

Comparative Example 1

An intermediate transferring belt was produced and evaluated in a manner similar to Example 1, except that the biaxial extrusion kneader having the die shown in FIGS. 1(A) and 1(B) connected to the discharge opening was replaced with a biaxial extrusion kneader without a die connected to the discharge opening. The Tg of the resulting polymer composition before molding was determined.

Example 5

An intermediate transferring belt was prepared and evaluated in a manner similar to Example 1, except that the 6 nylon used was replaced with an epoxy resin (epoxy resin 1256; Japan Epoxy Resins Co., Ltd). The Tg of the resulting polymer composition before molding was determined.

Comparative Example 2

An intermediate transferring belt was produced and evaluated in a manner similar to Example 5, except that the biaxial extrusion kneader having the die shown in FIGS. 1(A) and (B) connected to the discharge opening was replaced with a biaxial extrusion kneader without a die connected to the discharge opening. The Tg of the resulting polymer composition before molding was determined.

Heat Treatment

Each of the intermediate transferring belts (polymer compositions) obtained in Examples/Comparative Examples was heat-treated as shown below, and the Tg values before and after heat treatment were determined by the method described above.

The sample was pulverized, and the pulverized product was melt and kneaded in a biaxial extrusion kneader (KTX46; manufactured by Kobe Steel, Ltd) having the die of FIGS. 1(A) and (B) having the following dimension connected to its discharge opening, under such conditions as an internal temperature of 270° C., discharge rate of 30 kg/hour and a resin pressure of 4 MPa. Specifically, the kneaded material extruded out of the biaxial extrusion kneader was fed in a molten state through the inflow opening 5 into the reservoir $1a$ and then through the space $2a$ into the reservoir $1b$, in the die 10 shown in FIGS. 1(A) and 1(B). It was then fed through the space $2b$ into the reservoir $1c$ and finally out of the space $2c$. The flow rate during passing in space $2c$ was 83.3 g/minute per 1 cm² of space sectional area. The kneaded material extruded out of the space $2c$ was cooled rapidly by immersing it in water at 30° C. and pulverized into pellet-like shape by a pelletizer.

The die shown in FIGS. 1(A) and (B) having the following dimension was used, and heated to a temperature similar to the internal temperature of the biaxial extrusion kneader.
Reservoir $1a$; maximum height $h_1$: 10 mm, maximum cross-sectional area $S_{1a}$: 30 cm², and moving direction distance $m_1$: 2 mm;
Space $2a$; face-to-face distance $x_1$: 2 mm, cross-sectional area $S_{2a}$: 6 cm², moving direction distance $y_1$: 30 mm, and width direction distance $z_1$: 300 mm;
Reservoir $1b$; maximum height $h_2$: 10 mm, maximum cross-sectional area $S_{1b}$: 30 cm², and moving direction distance $m_2$: 20 mm;
Space $2b$; face-to-face distance $x_2$: 2 mm, cross-sectional area $S_{2b}$: 6 cm², moving direction distance $y_2$: 30 mm, and width direction distance $z_1$: 300 mm;
Reservoir $1c$; maximum height $h_3$: 10 mm, maximum cross-sectional area $S_{1c}$: 30 cm², and moving direction distance $m_3$: 20 mm;
Space $2c$; face-to-face distance $x_3$: 2 mm, cross-sectional area $S_{2c}$: 6 cm², and moving direction distance $y_3$: 30 mm.

TABLE 1

| | Surface resistance ($\Omega$/□) | Fluctuation in resistance | MIT value | Tg(° C.) Before heat treatment | Tg(° C.) After heat treatment |
|---|---|---|---|---|---|
| Example 1 | $2.0 \times 10^{10}$ | $10^{0.2}$ | 18000 | 87.0 | 86.9 |
| Example 2 | $2.5 \times 10^{10}$ | $10^{0.3}$ | 22000 | 86.8 | 86.9 |
| Example 3 | $3.0 \times 10^{10}$ | $10^{0.2}$ | 19500 | 87.1 | 87.0 |
| Example 4 | $1.5 \times 10^{10}$ | $10^{0.3}$ | 17000 | 87.0 | 87.0 |
| Comparative Example 1 | $1.0 \times 10^{10}$ | $10^{1.5}$ | 3500 | 90.4 | 86.9 |
| Example 5 | $5.0 \times 10^{10}$ | $10^{0.4}$ | 9000 | 89.0 | 89.0 |
| Comparative Example 2 | $7.5 \times 10^{10}$ | $10^{1.7}$ | 2900 | 92.2 | 89.0 |

Example 6

An intermediate transfer belt was produced and evaluated in a manner similar to Example 1, except that a die shown in FIGS. 1(A) and 1(B) having the dimensions shown below was used. The flow rate in space 2c was 83.3 g/minute per 1 cm² of space sectional area.

Reservoir 1a; maximum height $h_1$: 10 mm, maximum cross-sectional area $S_{1a}$: 30 cm², and moving direction distance $m_1$: 50 mm;
Space 2a; face-to-face distance $x_1$: 2 mm, cross-sectional area $S_{2a}$: 6 cm², moving direction distance $y_1$: 30 mm, and width direction distance $z_1$: 300 mm;
Reservoir 1b; maximum height $h_2$: 10 mm, maximum cross-sectional area $S_{1b}$: 30 cm², and moving direction distance $m_2$: 50 mm;
Space 2b; face-to-face distance $x_2$: 2 mm, cross-sectional area $S_{2b}$: 6 cm², moving direction distance $y_2$: 30 mm, and width direction distance $z_1$: 300 mm;
Reservoir 1c; maximum height $h_3$: 10 mm, maximum cross-sectional area $S_{1c}$: 30 cm², and moving direction distance $m_3$: 50 mm;
Space 2c; face-to-face distance $x_3$: 2 mm, cross-sectional area $S_{2c}$: 6 cm², moving direction distance $y_3$: 30 mm, and width direction distance $z_1$: 300 mm.

The surface resistance of the intermediate transfer belt in the circumferential direction was determined at 24 points at an interval of 20 mm, showing an average of $3 \times 10^{10} \Omega$/□ and a resistance dispersion in the peripheral direction of $10^{0.2}$. The MIT value was 19500.

Example 7

A polymer composition was prepared in a manner similar to Example 1, except that a mixture obtained by the following method was melt and kneaded in a biaxial extrusion kneader KTX30 (manufactured by Kobe Steel, Ltd) having a die of FIGS. 1(A) and 1(B) having the following dimensions that was connected to the discharge opening, under the conditions of a cylinder temperature of 220° C., a discharge rate of 12 kg/hour and a resin pressure of 3 MPa. The flow rate in space 2c was 33.3 g/minute per 1 cm² of space sectional area.

A polycarbonate (manufactured by Teijin Chemicals Ltd.; product name (Panlite® L-1250, Tg: 150° C.) and an ABS resin (manufactured by JSR Corporation; product name ABS-15, Tg: 105° C.) were dry-blended at a ratio of 1:1 by weight, to give a mixture.

Reservoir 1a; maximum height $h_1$: 10 mm, maximum cross-sectional area $S_{1a}$: 30 cm², and moving direction distance $m_1$: 20 mm;
Space 2a; face-to-face distance $x_1$: 2 mm, cross-sectional area $S_{2a}$: 6 cm², moving direction distance $y_1$: 30 mm, and width direction distance $z_1$: 300 mm;
Reservoir 1b; maximum height $h_2$: 10 mm, maximum cross-sectional area $S_{1b}$: 30 cm², and moving direction distance $m_2$: 20 mm;
Space 2b; face-to-face distance $x_2$: 2 mm, cross-sectional area $S_{2b}$: 6 cm², moving direction distance $y_2$: 30 mm, and width direction distance $z_1$: 300 mm;
Reservoir 1c; maximum height $h_3$: 10 mm, maximum cross-sectional area $S_{1c}$: 30 cm², and moving direction distance $m_3$: 20 mm;
Space 2c; face-to-face distance $x_3$: 2 mm, cross-sectional area $S_{2c}$: 6 cm², moving direction distance $y_3$: 30 mm, and width direction distance $z_1$: 300 mm.

Figure 10:
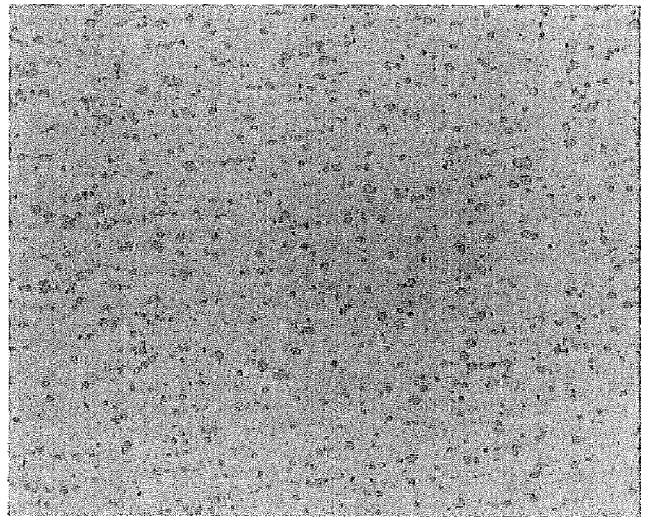
FIG. 10 is a transmission electron micrograph of the polymer composition obtained in Example 7.

No structure of 1 μm or more in size was observed in the transmission electron micrograph of the polymer composition obtained. The transmission electron micrograph is shown in FIG. 10.

Comparative Example 3

Figure 11:
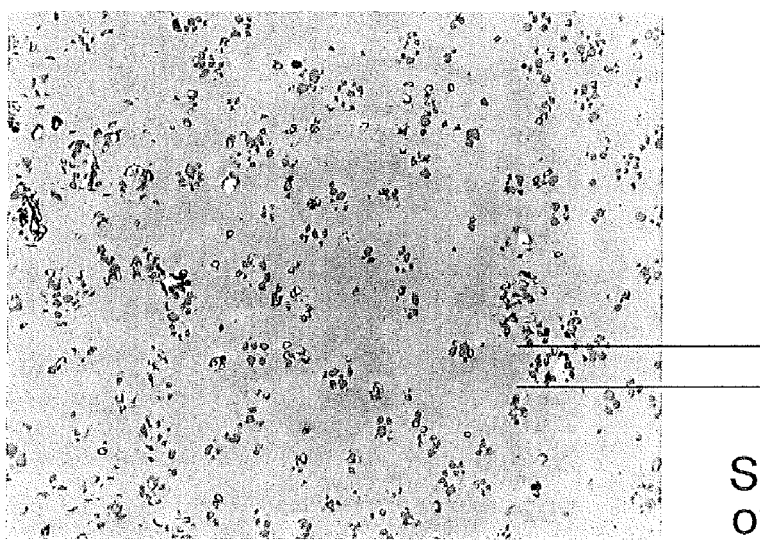
FIG. 11 is a transmission electron micrograph of the polymer composition obtained in Comparative Example 3.

A polymer composition was prepared in a manner similar to Example 7, except that the biaxial extrusion kneader having the die shown in FIGS. 1(A) and (B) connected to the discharge opening was replaced with a biaxial extrusion kneader without a die connected to the discharge opening. Structure of 6 μm or more in size was observed in the transmission electron micrograph of the polymer composition obtained. The transmission electron micrograph is shown in FIG. 11.

Comparative Example 4

Figure 12:
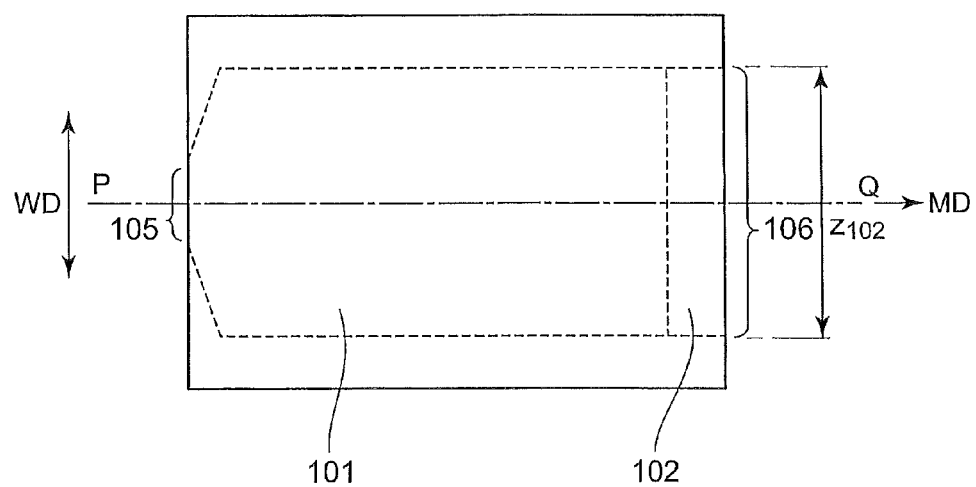
FIG. 12(A) is a schematic perspective view illustrating an example of the apparatus for producing a polymer composition used in Comparative Examples 4 and 5, seen from the top face.
FIG. 12(B) is a schematic sectional view of the apparatus of FIG. 12(A) along the line P-Q.
Figure 12:
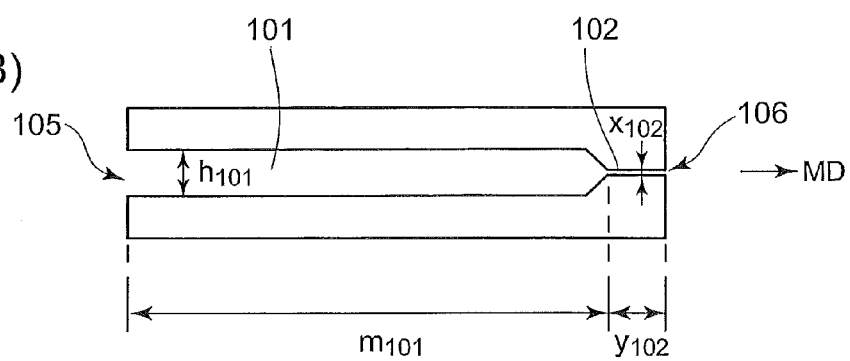

An intermediate transfer belt was produced and evaluated in a manner similar to Example 1, except that the die shown in FIGS. 12(A) and 12(B) having the following dimensions was used. The flow rate in space 102 was 83.3 g/minute per 1 cm² of space sectional area.

Reservoir 101; maximum height $h_{101}$: 10 mm, maximum cross-sectional area $S_{101}$: 30 cm², and moving direction distance $m_{101}$: 2 mm;
Space 102; face-to-face distance $x_{102}$: 2 mm, cross-sectional area $S_{102}$: 6 cm², moving direction distance $y_{102}$: 30 mm, and width direction distance $z_{102}$: 300 mm.

The surface resistance of the intermediate transfer belt in the circumferential direction was determined at 24 points at an interval of 20 mm, showing an average of $2 \times 10^{10} \Omega$/□ and a resistance dispersion in the peripheral direction of $10^{1.8}$. The MIT value was 5500.

Comparative Example 5

An intermediate transfer belt was produced and evaluated in a manner similar to Example 1, except that the die shown in FIGS. 12(A) and 12(B) having the following dimensions was used. The flow rate in space 102 was 83.3 g/minute per 1 cm² of space sectional area.

Reservoir 101; maximum height $h_{101}$: 10 mm, maximum cross-sectional area $S_{101}$: 30 cm², and moving direction distance $m_{101}$: 2 mm;
Space 102; face-to-face distance $x_{102}$: 2 mm, cross-sectional area $S_{102}$: 6 cm², moving direction distance $y_{102}$: 60 mm, and width direction distance $z_{102}$: 300 mm.

The surface resistance of the intermediate transfer belt in the circumferential direction was determined at 24 points at an interval of 20 mm, showing an average of $4\times10^{10}\Omega/\square$ and a resistance dispersion in the peripheral direction of $10^{1.3}$. The MIT value was 8200.

INDUSTRIAL APPLICABILITY

The method and apparatus for producing a polymer composition according to the present invention can be applied to various wide fields of applications including electric and electronic parts, auto parts, general mechanical parts and the like. In particular, a transfer belt obtained by using the polymer composition produced by the method according to the present invention is superior in resistance stability and strength in a circumferential direction of the belt, when applied as a direct or intermediate transfer belt used in electrophotographic image-forming apparatuses.

What is claimed is:

1. A method for producing a polymer composition, comprising: melting a polymer mixture containing at least two kinds of polymer to obtain a molten polymer mixture, and passing the molten polymer mixture in a moving direction through two or more spaces between two parallel faces, wherein the polymer mixture comprises a polyphenylene sulfide resin and a nylon resin, and wherein a distance x between the two parallel faces of each of the two or more spaces is independently 0.5 to 5 mm and a distance y of each of the two or more spaces in the moving direction is independently 2 to 100 mm.

2. The method according to claim 1, wherein each of the two or more spaces is independently formed of two flat faces or two curved faces.

3. The method according to claim 1, further comprising:
cooling rapidly the molten polymer mixture after the molten polymer mixture has passed through the spaces.

* * * * *